United States Patent [19]

Huettner et al.

[11] 3,810,120

[45] May 7, 1974

[54] AUTOMATIC DEACTIVATION DEVICE

[75] Inventors: Robert E. Huettner, Acton; Edward B. Tymann, Natick, both of Mass.

[73] Assignee: Honeywell Information Systems Inc., Waltham, Mass.

[22] Filed: Feb. 12, 1971

[21] Appl. No.: 114,876

[52] U.S. Cl. .............................. 340/172.5, 235/153
[51] Int. Cl. . G06f 11/06, G06k 17/00, G05b 13/02
[58] Field of Search ....... 340/172.5, 146.1; 235/153

[56] References Cited

UNITED STATES PATENTS

| | | | |
|---|---|---|---|
| 3,519,988 | 7/1970 | Grossman | 340/146.1 AG |
| 3,539,992 | 11/1970 | Kernahan | 340/146.1 F |
| 3,723,975 | 3/1973 | Kurtz | 340/172.5 |
| 3,491,340 | 1/1970 | Richman et al. | 340/172.5 |
| 3,399,382 | 8/1968 | Thron et al. | 340/172.5 |
| 3,427,591 | 2/1969 | Nishioka | 340/172.5 |
| 3,548,177 | 12/1970 | Hartlipp et al. | 235/153 |
| 3,566,351 | 2/1971 | Sekse et al. | 340/146.1 |
| 3,573,743 | 4/1971 | Hadd et al. | 340/172.5 |
| 3,644,901 | 2/1972 | Zingg | 340/172.5 |

*Primary Examiner*—Gareth D. Shaw
*Assistant Examiner*—Jan E. Rhoads
*Attorney, Agent, or Firm*—Faith F. Driscoll; Ronald T. Reiling

[57] ABSTRACT

An apparatus is associated with scanning apparatus for a number of peripheral input and output devices connected to a common input/output bus of a terminal system. The apparatus includes means for detecting a failure in any one of the peripheral devices by monitoring the condition of the terminal bus. Upon detecting the presence of a failed device on the bus, the apparatus then determines automatically whether the device is operating as an input or output device and thereafter selectively disables the failed device whereby the terminal system is placed in a state in which it can still continue system data transfer operations.

18 Claims, 24 Drawing Figures

ROBERT E. HUETTNER
EDWARD B. TYMANN
INVENTORS

BY Faith F. Driscoll
ATTORNEY

| PRESENT STATE: IDLE STATE | READY STATE | ON-LINE STATE | OFF-LINE STATE | AUDIT TRAIL STATE | NEXT STATE: IDLE STATE | READY STATE | ON-LINE STATE | OFF-LINE STATE | AUDIT TRAIL STATE | VARIABLES: IDLE STATE SWITCH | ON-LINE STATE SWITCH | AUDIT TRAIL STATE SWITCH | OFF-LINE STATE SWITCH | GDCA CHECK CONDITION | DEVICE DATA READY | EXECUTE PUSHBUTTON | NORMAL MEMORY RELEASE | CHECK RELEASE MEMORY | SELECTION OR POLLING ADDRESS | OFF-LINE CYCLE | BUS STROBE | BUS BUSY LINE | REMARKS |
|---|---|---|---|---|---|---|---|---|---|---|---|---|---|---|---|---|---|---|---|---|---|---|---|
| | | | | | | | | | | OUTPUT DEVICE CONTROL AREA | | | | | | | | | | | | | |
| 1 | 0 | 0 | 0 | 0 | 0 | 0 | 0 | 1 | 0 | | | | 1 | 0 | | 1 | | | | | 1 | | OPERATOR ACTION |
| 0 | 1 | 0 | 0 | 0 | 0 | 0 | 0 | 1 | 0 | | | | 1 | 0 | | | | | | 1 | 1 | | " " |
| 0 | 0 | 1 | 0 | 0 | 0 | 0 | 0 | 1 | 0 | | | | 1 | 0 | 1 | | 1 | | | | 1 | | " " |
| 0 | 0 | 1 | 0 | 0 | 0 | 0 | 0 | 1 | 0 | | | | 1 | 0 | 1 | | | | | | 1 | | " " |
| 0 | 0 | 0 | 0 | 1 | 0 | 0 | 0 | 1 | 0 | | | | 1 | 0 | 1 | | | | | | 1 | | " " |
| 0 | 1 | 0 | 0 | 0 | 0 | 0 | 1 | 0 | 0 | | 1 | | | 0 | | | | | 1 | | 1 | 0 | SELECTION ADDRESS |
| 0 | 0 | 0 | 0 | 1 | 0 | 0 | 1 | 0 | 0 | | | 1 | | 0 | | | | | 1 | | 1 | 0 | " " |
| 1 | 0 | 0 | 0 | 0 | 0 | 0 | 0 | 0 | 1 | | | 1 | | 0 | | 1 | | | | | 1 | | OPERATOR ACTION |
| 0 | 1 | 0 | 0 | 0 | 0 | 0 | 0 | 0 | 1 | | | 1 | | 0 | | | | | | 1 | 1 | | " " |
| 0 | 0 | 1 | 0 | 0 | 0 | 0 | 0 | 0 | 1 | | | 1 | | 0 | 1 | | 1 | | | | 1 | | " " |
| 0 | 0 | 1 | 0 | 0 | 0 | 0 | 0 | 0 | 1 | | | 1 | | 0 | 1 | | | | | | 1 | | " " |
| 0 | 0 | 0 | 1 | 0 | 0 | 0 | 0 | 0 | 1 | | | 1 | | 0 | 1 | | | | | | 1 | | " " |
| 1 | 0 | 0 | 0 | 0 | 0 | 1 | 0 | 0 | 0 | | 1 | | | 0 | | 1 | | | | | 1 | | OPERATOR ACTION |
| 0 | 0 | 1 | 0 | 0 | 0 | 1 | 0 | 0 | 0 | | 1 | | | 0 | 1 | | 1 | | | | 1 | | SCANNER RELEASE |
| 0 | 0 | 1 | 0 | 0 | 0 | 1 | 0 | 0 | 0 | | 1 | | | 0 | 1 | | | | | | 1 | | OPERATOR ACTION |
| 0 | 0 | 0 | 1 | 0 | 0 | 1 | 0 | 0 | 0 | | 1 | | | 0 | 1 | | | | | | 1 | | " " |
| 0 | 0 | 0 | 0 | 1 | 0 | 1 | 0 | 0 | 0 | | 1 | | | 0 | 1 | | | | | 1 | 1 | | " " |
| 0 | 1 | 0 | 0 | 0 | 1 | 0 | 0 | 0 | 0 | 1 | | | | | | | | | | 1 | 1 | | OPERATOR ACTION |
| 0 | 1 | 0 | 0 | 0 | 1 | 0 | 0 | 0 | 0 | | | | | 1 | | | | | | 1 | 1 | | GDCA LOGIC |
| 0 | 0 | 1 | 0 | 0 | 1 | 0 | 0 | 0 | 0 | | | | | 1 | | | 1 | | | | 1 | | SCANNER RELEASE |
| 0 | 0 | 1 | 0 | 0 | 1 | 0 | 0 | 0 | 0 | | | | | 1 | | | | 1 | | | 1 | | SCANNER TIMEOUT |
| 0 | 0 | 1 | 0 | 0 | 1 | 0 | 0 | 0 | 0 | | | | | | 0 | | | 1 | | | 1 | | " " |
| 0 | 0 | 1 | 0 | 0 | 1 | 0 | 0 | 0 | 0 | 1 | | | | | 1 | | 1 | | | | 1 | | OPERATOR ACTION |
| 0 | 0 | 1 | 0 | 0 | 1 | 0 | 0 | 0 | 0 | 1 | | | | | 1 | | | | | | 1 | | " " |
| 0 | 0 | 0 | 1 | 0 | 1 | 0 | 0 | 0 | 0 | 1 | | | | | 1 | | | | | | 1 | | " " |
| 0 | 0 | 0 | 0 | 1 | 1 | 0 | 0 | 0 | 0 | 1 | | | | | 1 | | | | | | 1 | | " " |
| 0 | 0 | 0 | 0 | 1 | 1 | 0 | 0 | 0 | 0 | | | | | 1 | | | | | | 1 | 1 | | GDCA LOGIC |
| 0 | 0 | 0 | 0 | 1 | 1 | 0 | 0 | 0 | 0 | | | | | 0 | 0 | | | 1 | | | 1 | | SCANNER TIMEOUT |
| | | | | | | | | | | INPUT DEVICE CONTROL AREA | | | | | | | | | | | | | |
| 1 | 0 | 0 | 0 | 0 | 0 | 0 | 0 | 1 | 0 | | | | 1 | 0 | | 1 | | | | 1 | 1 | 0 | OPERATOR ACTION |
| 0 | 1 | 0 | 0 | 0 | 0 | 0 | 0 | 1 | 0 | | | | 1 | 0 | | | | | | 1 | 1 | 0 | " " |
| 0 | 0 | 1 | 0 | 0 | 0 | 0 | 0 | 1 | 0 | | | | 1 | 0 | 1 | | 1 | | | 1 | 1 | 0 | " " |
| 0 | 1 | 0 | 0 | 0 | 0 | 0 | 1 | 0 | 0 | | 1 | | | 0 | | | | | 1 | | 1 | 0 | POLLING ADDRESS |
| 1 | 0 | 0 | 0 | 0 | 0 | 1 | 0 | 0 | 0 | | 1 | | | 0 | | 1 | | | | | 1 | | OPERATOR ACTION |
| 0 | 0 | 1 | 0 | 0 | 0 | 1 | 0 | 0 | 0 | | 1 | | | 0 | 1 | | 1 | | | | 1 | | SCANNER RELEASE |
| 0 | 0 | 0 | 1 | 0 | 0 | 1 | 0 | 0 | 0 | | 1 | | | 0 | 1 | | | | | | 1 | | OPERATOR ACTION |
| 0 | 1 | 0 | 0 | 0 | 1 | 0 | 0 | 0 | 0 | 1 | | | | | | | | | | 1 | 1 | | OPERATOR ACTION |
| 0 | 1 | 0 | 0 | 0 | 1 | 0 | 0 | 0 | 0 | | | | | 1 | | | | | | 1 | 1 | | GDCA LOGIC |
| 0 | 0 | 1 | 0 | 0 | 1 | 0 | 0 | 0 | 0 | 1 | | | | | 1 | | 1 | | | | 1 | | OPERATOR ACTION |
| 0 | 0 | 1 | 0 | 0 | 1 | 0 | 0 | 0 | 0 | | | | | | 0 | | | 1 | | | 1 | | SCANNER TIMEOUT |
| 0 | 0 | 1 | 0 | 0 | 1 | 0 | 0 | 0 | 0 | | | | | 1 | | | 1 | | | | 1 | | OPERATOR ACTION REQ. |
| 0 | 0 | 0 | 1 | 0 | 1 | 0 | 0 | 0 | 0 | 1 | | | | | 1 | | | | | | 1 | | OPERATOR ACTION |

DCA STATE TRANSITION TABLE

Fig. 5.

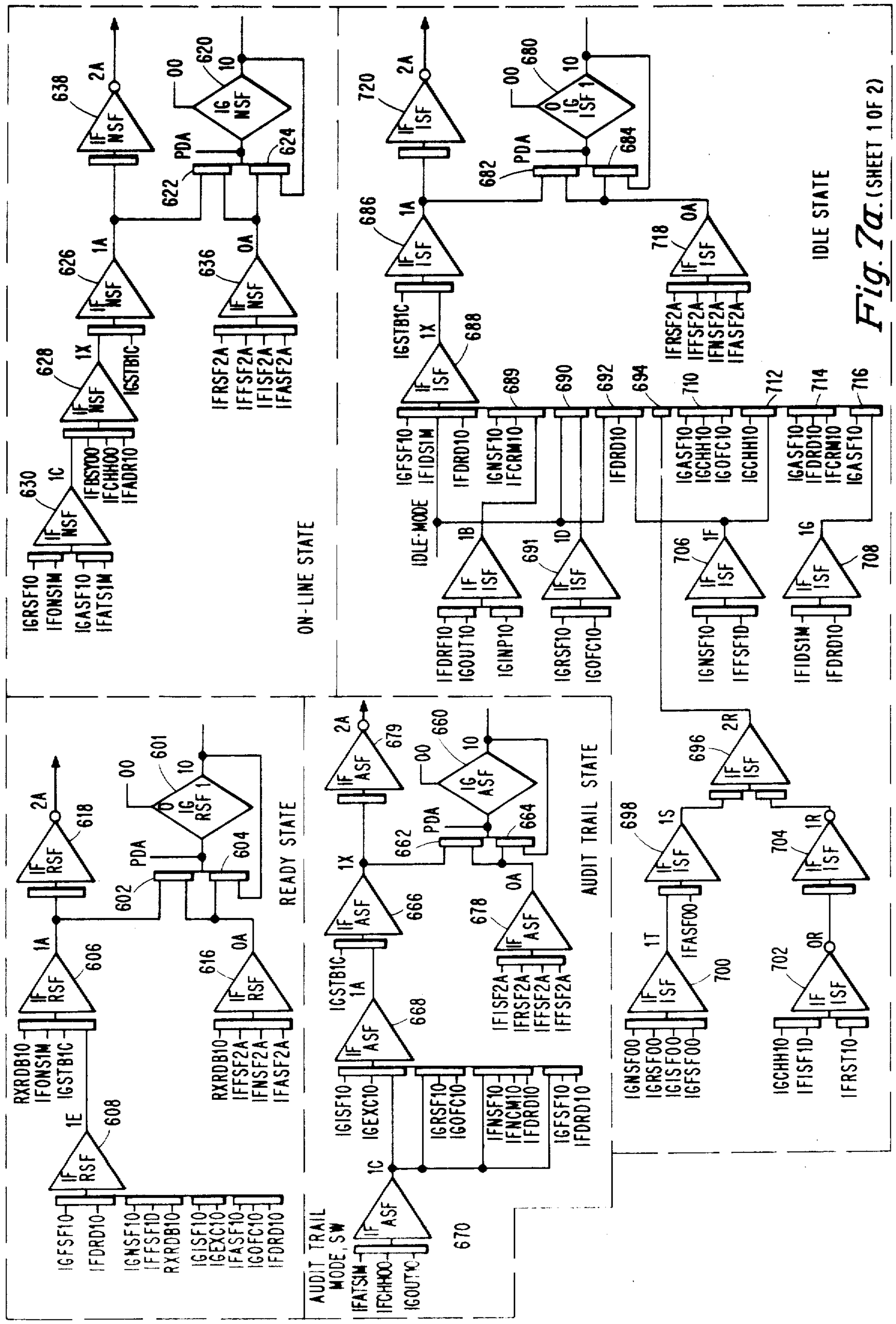
Fig. 7a. (SHEET 1 OF 2)

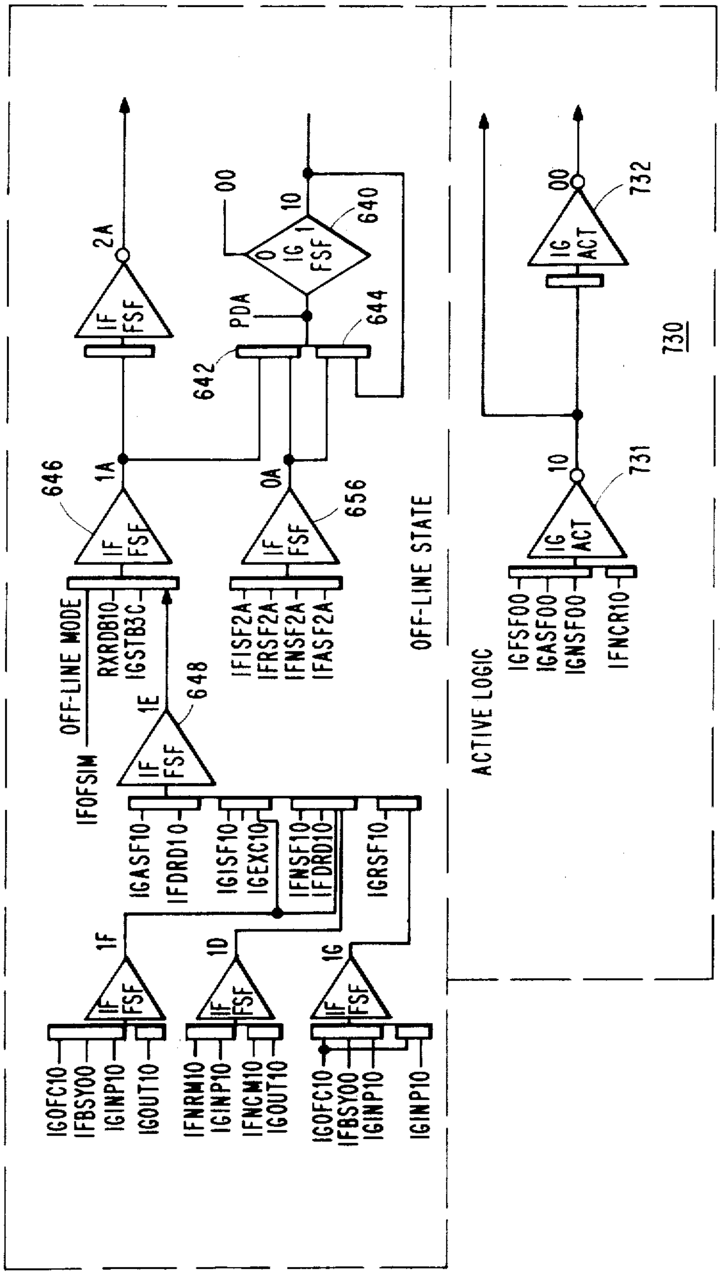
Fig. 7a. (SHEET 2 OF 2)

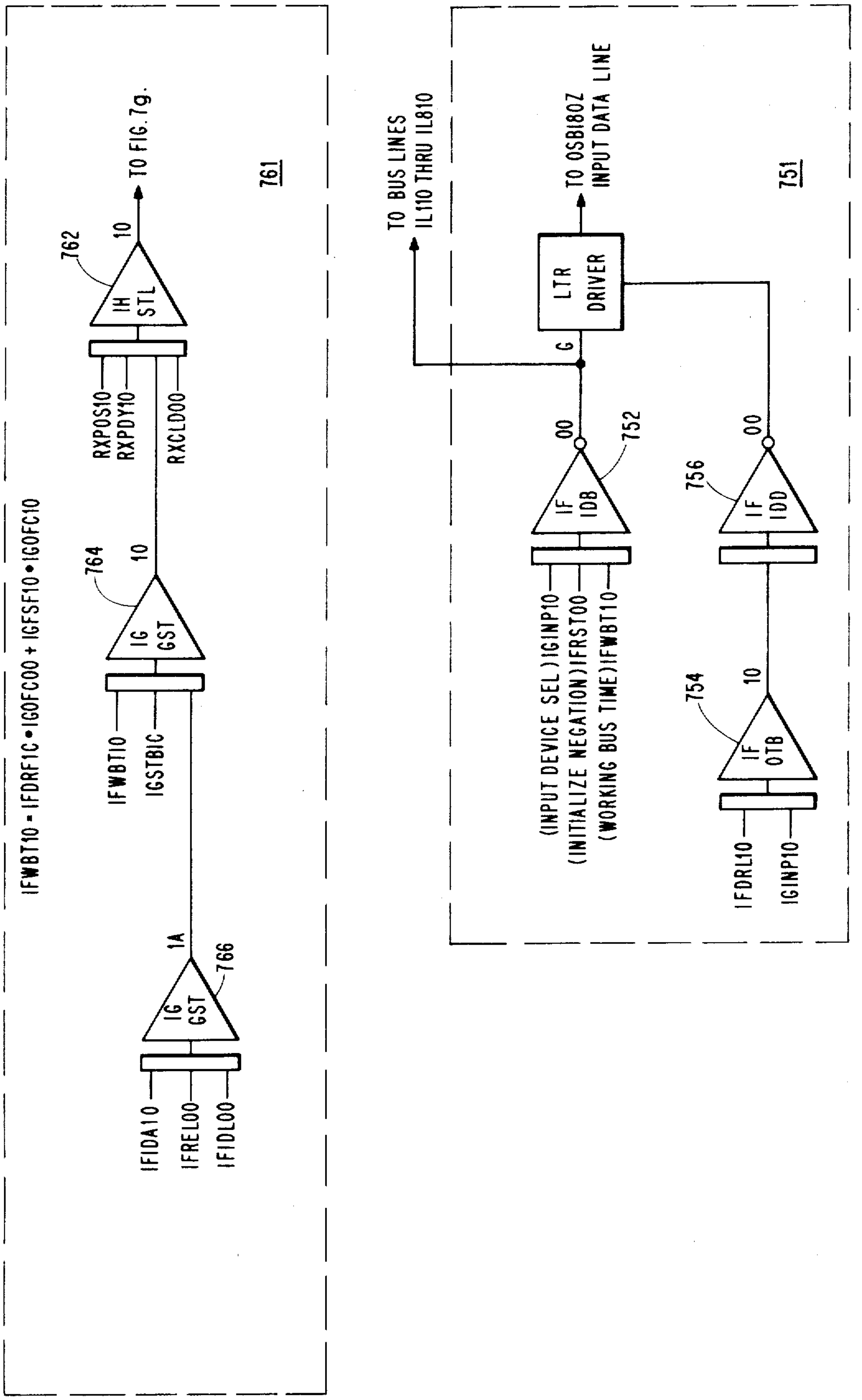
Fig. 7b. (SHEET 1 OF 4)

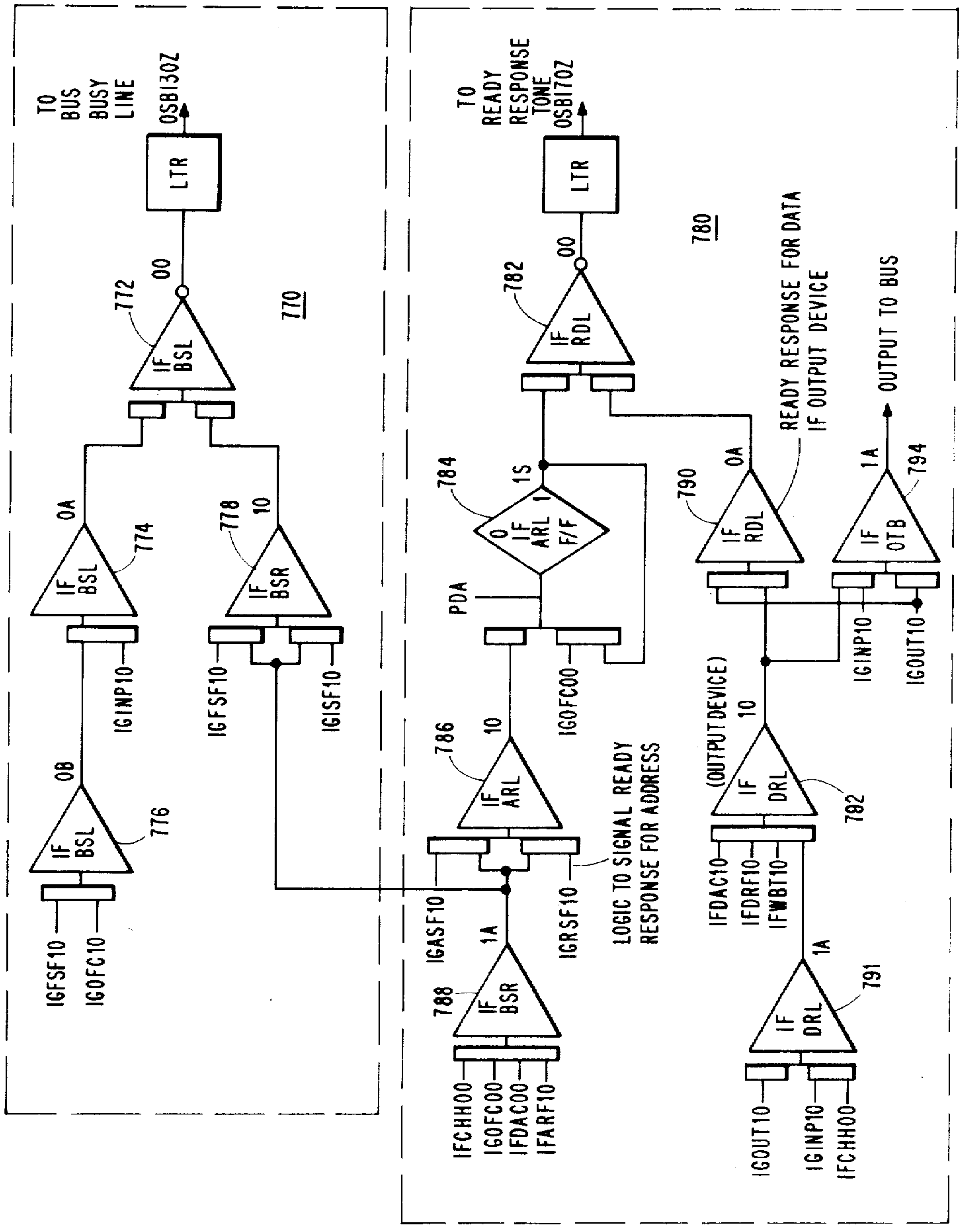
Fig. 7b (SHEET 2 OF 4)

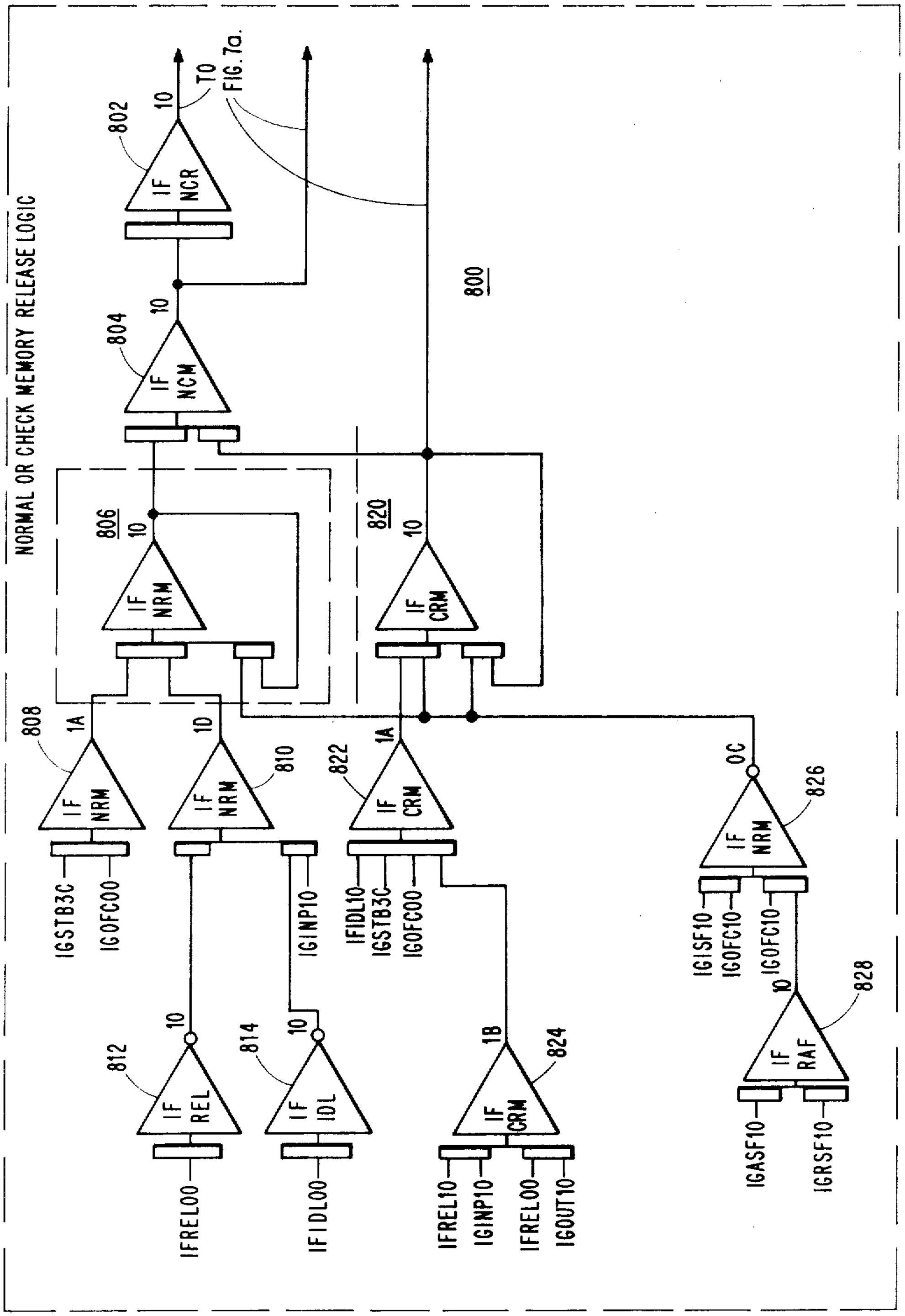
Fig. 7b. (SHEET 3 OF 4)

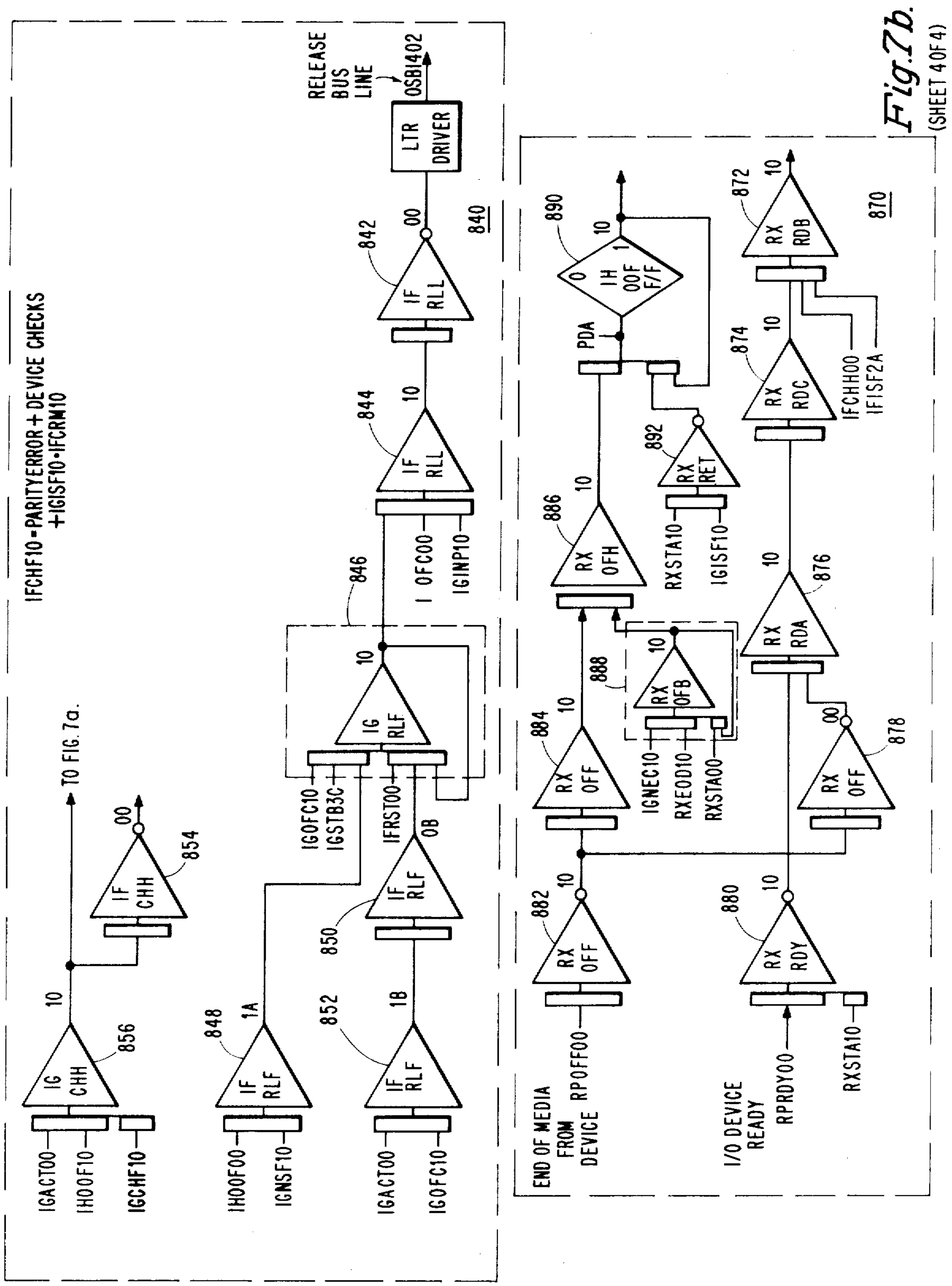
Fig. 7b. (SHEET 4 OF 4)

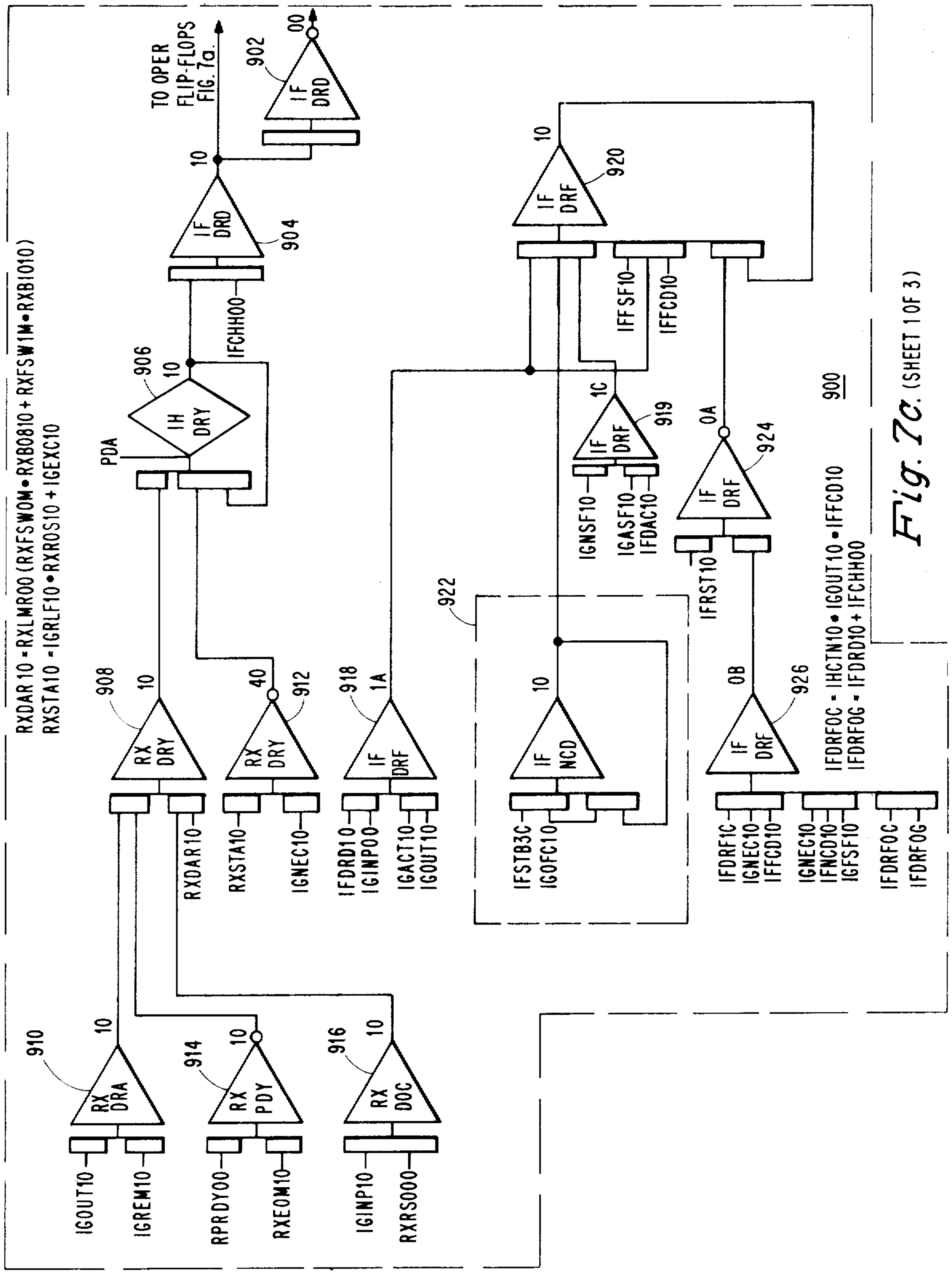
Fig. 7c. (SHEET 1 OF 3)

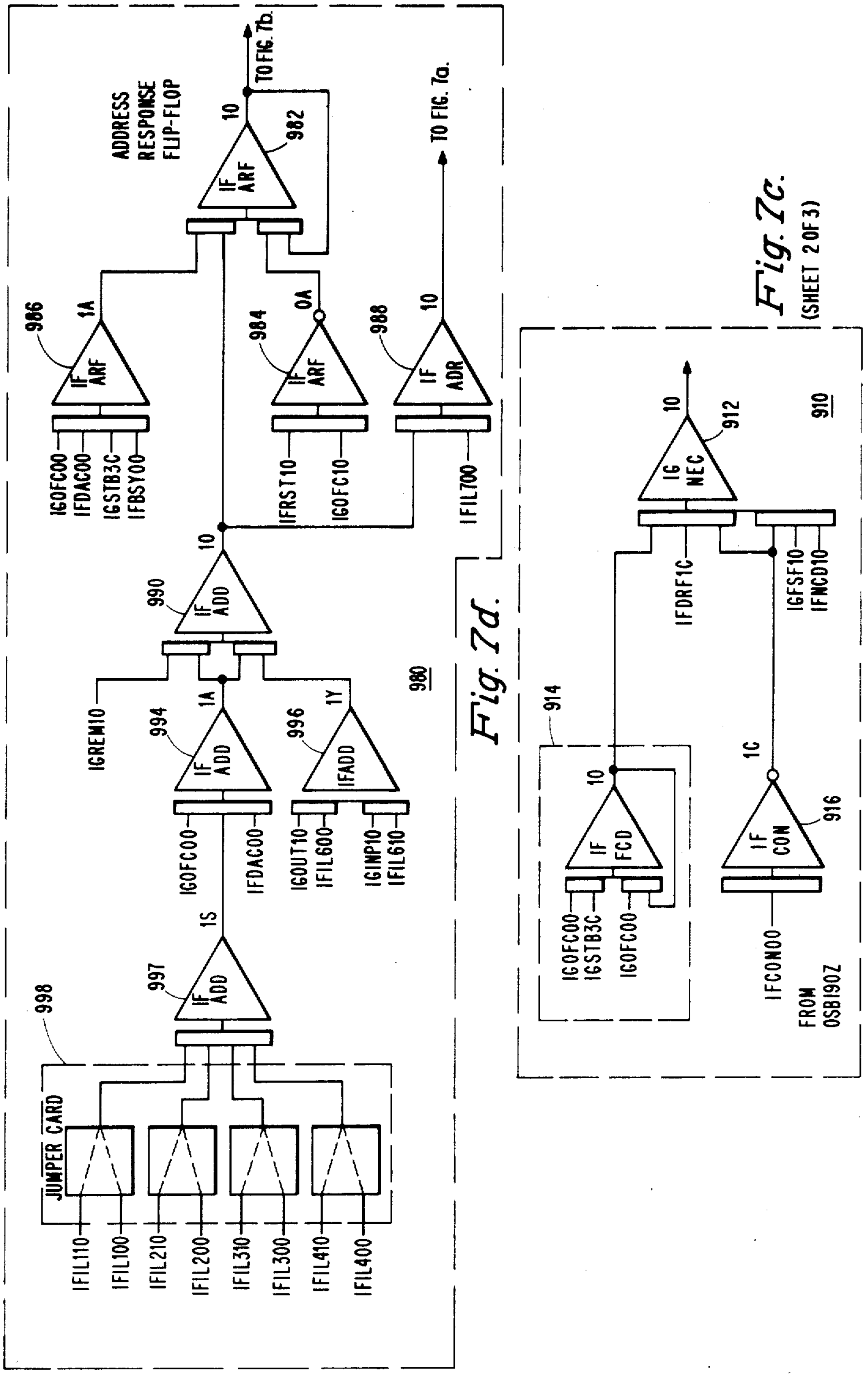
Fig. 7d. Fig. 7c. (SHEET 2 OF 3)

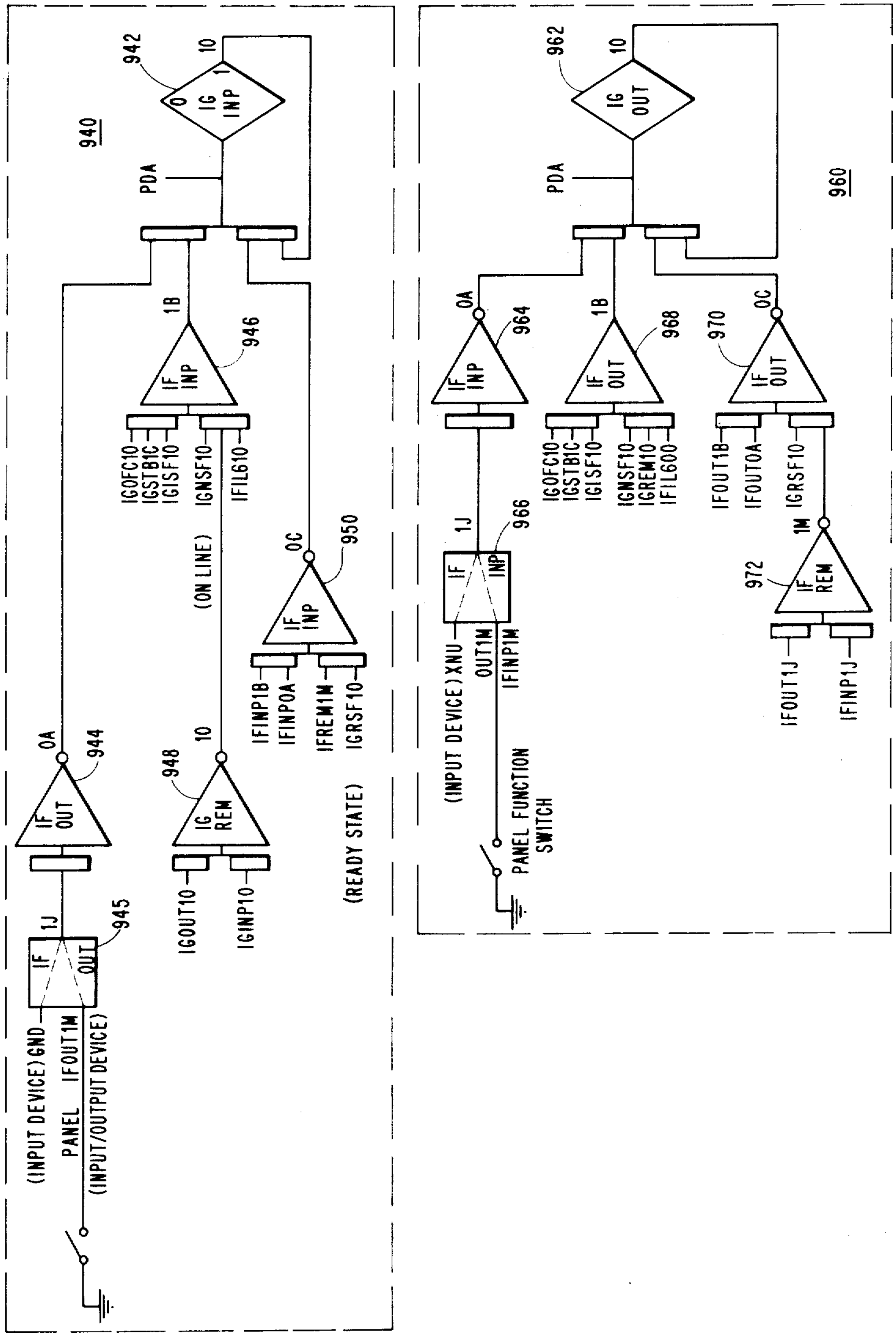
Fig. 7c. (SHEET 3 OF 3)

AUTOMATIC DEACTIVATION DEVICE

RELATED APPLICATIONS

1. A Communication Control Device utilized as an Input/Output Module for a Terminal System invented by Robert E. Huettner, Richard Nolin and Edward B. Tymann, filed on Feb. 11, 1971 Ser. No. 114,852, now U.S. Pat. No. 3,771,134, and assigned to the same assignee named herein.

2. "Multifunction Polling Technique" invented by Robert E. Huettner, Richard Nolin and Edward B. Tymann, filed on Feb. 11, 1971, Ser. No. 114,431, now U.S. Pat. No. 3,725,871, and assigned to the same assignee named herein.

3. "Remote Terminal System" invented by Robert E. Huettner and Edward B. Tymann, filed on Feb. 11, 1971, Ser. No. 114,912 and assigned to the same assignee named herein.

BACKGROUND OF THE INVENTION

Field of Use

This invention relates to data processing systems and more particularly to apparatus for detecting the presence of a failed peripheral device within a system.

Prior Art

Data processing systems, as for example, data preparation terminals, normally include a number of input and output devices connected to communicate over a common bus. These devices usually operate independent of one another. That is, each device has its own supply circuits and interface logic circuits within its associated unit which permits it to perform as an input device, as an output device or as both.

In general, in a prior art terminal system when a device fails, the terminal system is unable to continue operation until either the failure is corrected or the failed device manually disconnected from the system. Since the foregoing is usually accomplished by an operator, the prior art terminal system cannot be unattended without incurring a loss of communication in the event of a device failure.

Accordingly, it is an object of this invention to provide apparatus for a data processing system permitting unattended operation without a loss of communication notwithstanding device failures.

It is further an object of this invention to provide apparatus for detecting the presence of a failed device by monitoring a bus to which the device and its associated logic circuits connect.

It is a more specific object of the invention to provide apparatus associated with the scanning apparatus of a terminal system which can selectively detect whether the failed device is being operated as either an input device or as an output device.

It is still a more specific object of the invention to detect the presence of a device failure and thereafter selectively deactivate the failed device and its associated logic circuits from the terminal bus placing the terminal system in a condition wherein it can still continue operation.

SUMMARY OF THE INVENTION

These and other objects are accomplished through the basic concept of the invention as illustrated by the preferred embodiment which includes monitoring means associated with scanning logic circuits which monitors the activity on the bus to which each device and its associated interface logic circuits connects. When the period of inactivity on the bus exceeds a predetermined amount of time, the means generates an appropriate release and/or idle signal on the bus which disconnects the failed device from the bus.

In more particular terms, the device scanner establishes the basic system timing for data transfers on the bus and monitors the data exchange between devices to detect excessive delay periods caused by a faulty input device data source or by a faulty output data receiver.

In the illustrated embodiment, during each data character transfer, the input device signals the system via a first common line to indicate that it has a new character available for transfer. Also, each output device signals its acceptance of a data character and that it is ready to accept another data character by a second common line. By monitoring the length of time it takes an input device to signal via the first line and the length of time it takes an output device to signal via the second line, the scanner can detect the presence of either a faulty input device or output device. When an input or output device does not respond properly, the scanner activates common lines coded to switch only the faulty input device interface control logic circuits to a predetermined state which releases the device from the bus. When a faulty device's control logic circuits are in this predetermined state, they will thereafter signal that its device is unavailable for data transfers when the device is next addressed.

BRIEF DESCRIPTION OF THE DRAWINGS

FIG. 5 summarizes the states of the pertinent control functions generated by the general device controller of FIG. 1 during system operation.

FIG. 7*a* shows in greater detail the Mode Selection Logic Section of FIG. 7.

FIG. 7*b* shows in greater detail the Bus Interface Logic Section of FIG. 7.

FIG. 7*c* shows in greater detail the Input/Output Device Selection Logic Section of FIG. 7.

FIG. 7*d* shows in greater detail the Address Response Logic Section of FIG. 7.

DESCRIPTION OF THE TERMINAL SYSTEM

Figure 1:
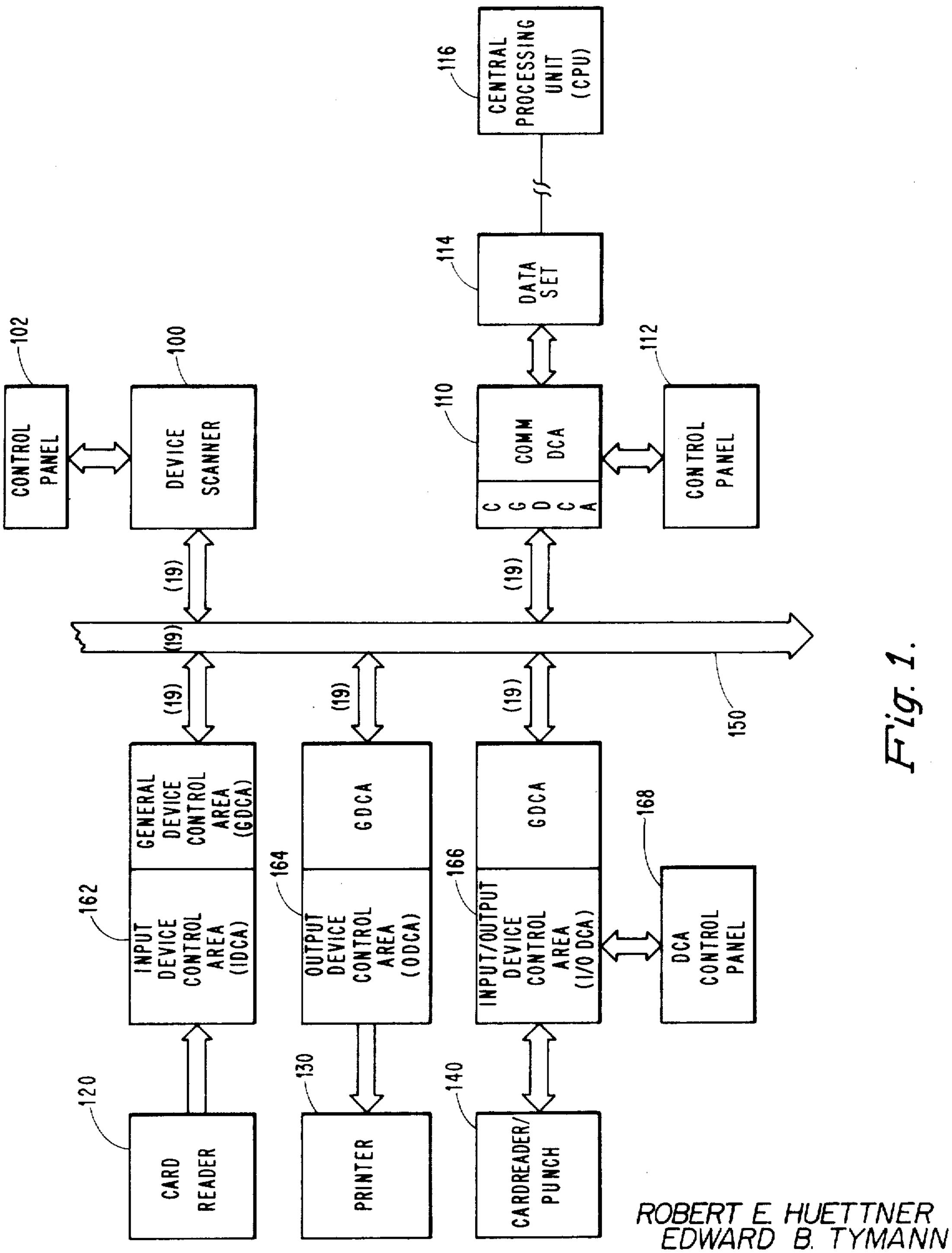
FIG. 1 is a block diagram of a terminal system embodying the principles of the present invention.

FIG. 1 is a block diagram of the system of the subject invention which includes input device control apparatus in the form of a device scanner 100, a communications control unit, referenced as a COMM DCA 110, and a plurality of peripheral input and output devices 120, 130 and 140, all of which connect in common to a bus 150. As shown, the peripheral devices which include a card reader, a printer, and a card reader/punch communicate with the bus 150 through their respective device controllers 162, 164, and 166. These controllers labeled input DCA, output DCA and input/output DCA respectively include control logic, individual buffer storage, interface circuits and power supplies required to regulate the operation of their associated peripheral device. It will be appreciated that while only three peripheral devices are shown in the Figure, the system can accommodate considerably more devices. For example, the system of the present embodiment can accommodate up to 16 input and 16 output devices. Of course, each I/O device will be considered as two devices.

Each of the device controllers has a standard logic interface area termed a general device control area (GDCA) which provides a common interface to the bus 150. The bus 150 consists of nineteen lines that include nine information lines for transferring address and data information, cycle timing signal lines and several control lines. The interface which will be described herein is disclosed in FIG. 2.

The device scanner 100 regulates the transfer data from each of the input devices by generating the timing cycles used in conjunction with data transfers along the bus 150 and generates pertinent control signals. When an input peripheral device is activated, the device scanner 100 is operative to monitor the activity of the terminal bus 150.

In a transaction mode, the device scanner 100 is operative to terminate a transfer of a block of data by generating a release control signal over the bus when it detects a special control character within the data segment.

In general, the COMM DCA 110 provides an interface between the terminal bus 150 of the system of the present invention and a communications channel (i. e. a modulator demodulator unit termed a MODEM). This unit allows the terminal system to operate on line to a remotely located data processing system. In particular, the COMM DCA 110 enables the system to respond to control procedures which poll and select peripheral devices for either transmitting or receiving data through conventional data sets or other telephone line interfaces. Additionally, the DCA 110 includes a memory buffer which provides the necessary buffer capacity for efficient communication operation. The COMM DCA 110 is operative to provide the requisite checking and automatic blocking for messages. For further details as to the above operations, reference may be made to the copending applications titled "A communication Control Device utilized as an Input/Output Module for a Terminal System", and "A Multifunction Polling Technique" referenced above which are incorporated by reference herein.

TERMINAL BUS 150

Figure 2:
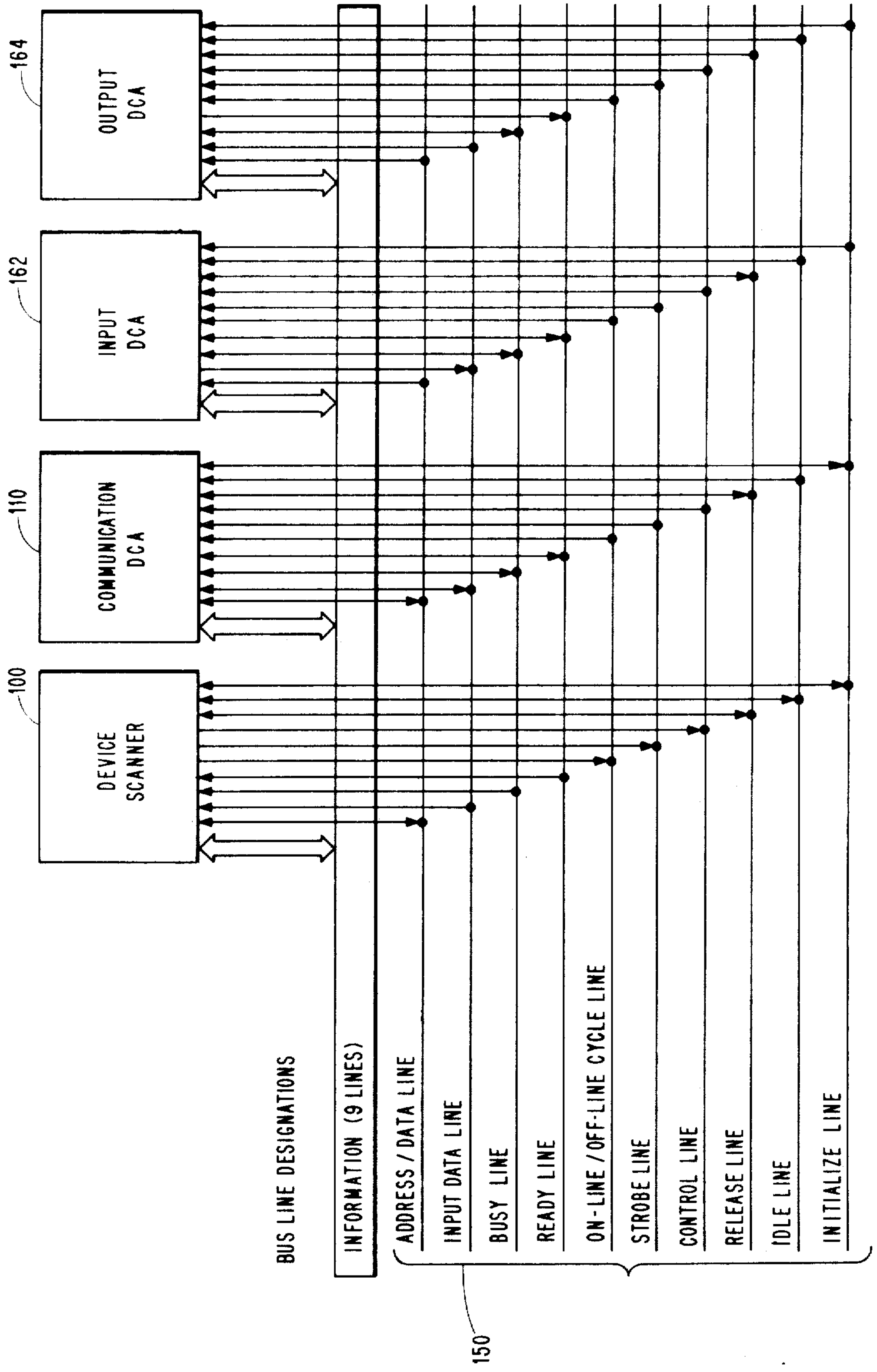
FIG. 2 shows the bus 150 of FIG. 1 in greater detail.

Before discussing the above Figures, reference is made to FIG. 2 mentioned above. A general description of each bus line which forms the bus 150 is summarized in the following table.

TABLE

INTERCONNECTING LINES

| FUNCTION | SIGNAL LINE | DESCRIPTION |
|---|---|---|
| IL110/IL100 Through IL910/IL900 | INFORMATION (OSB010Z Through OSB090Z) | Lines 1 through 9 are used to transfer both data and address information. During On-Line cycles, the condition of the ADDRESS/DATA line specifies the content of the information lines. During OFF-LINE cycles, the lines are used only for data transfer. When used for address information, line $L_1$ through $I_4$ contain the DCA address, line $I_8$ specifies whether the addressed DCA is to operate as an IDCA or an ODCA, and line $I_7$ specifies either an activation address or status poll address. When used for data transfer, input DCA's place data on line $I_1$ through $I_8$ and output DCA's receive data from these lines. Line Ig is provided for future expansion. |
| OFC00/ | ON/OFF LINE | The ON/OFF LINE SIGNAL is generated continuously by the Device Scanner and provides time sharing of the bus **150.** The On-line condition allows addressing, address response, and On-line data transfers. The off-line conditions allows Off-line data transfer only. |
| DAC00/ DAC10 | ADDRESS/DATA OSB120Z | The condition of this line specifies the content of the Information lines during On-line operation. The address condition allows all DCA's to recognize and respond to addresses on the information lines. The data condition allows On-line DCA's to transfer data over the information lines. |
| STB10/ STB00 | STROBE (OSB100Z) | The Strobe signal is generated by the Scanner during each ON-LINE and OFF-LINE cycle. This signal specifies the valid interval for all signals appearing on the bus. DCA's sample the Information, Idle, and Release lines during the Strobe Interval. This signal also provides timing for internal DCA functions. |
| BSY10/ BSY00 | BUSY (OSB130Z) | The Busy signal inhibits On-line activation of DCA's while the COMM DCA is in the quiescent (receive) state. It is also used for On-line address/status response, to inhibit On-line data timeout, and to prevent more than one IDCA from entering the Off-line mode. A signal on the Busy line inhibits address recognition in all IDCA's. DCA's addressed while in the Idle, Off-line, or On-line mode respond by generating a Busy signal. An Off-line IDCA will maintain a signal on the Busy line to prevent any other IDCA from entering the Off-line state. |

| | | |
|---|---|---|
| IDA10/ IDA00 | INPUT DATA (OSB180Z) | An activated IDCA will trnasfer a character to the Information lines and then maintain the Input Data signal on this line until a signal on the CONTROL line is detected. The activated IDCA then resets the Input Data signal until the next character is ready for transfer. Activated ODCA's will accept data from the information lines only when the Input Data signal is present. |
| RDY10/ RDY00 | READY (OSB170Z) | Used to indicate that addressed DCA's are activated and to acknowledge single character transfer during On-line and Off-line operation. The scanner senses the transition and generates a signal on the CONTROL line indicating affirmative response to an IDCA or COMM DCA. |
| SMC10/ SMC00 | INITIALIZE (OSB160Z) | Used to interrupt all activity and initialize the terminal. The Initialize signal switches all DCA's to the Idle State. |
| CON00/ | CONTROL | Generated by the Scanner to indicate affirmative address response or Next Character Requested in response to a a change in state in READY line |
| CON00 | (OSB190Z) | |
| REL10/ REL00 | Release (OSB140Z) | The condition of this line determines when all DCA's in an On-line state will be switched to their ready state except for DCA's in the audit trail mode which remain in the On-line mode. ON-LINE IDCA's change the condition of this line to indicate termination of an input data transfer operation when the system is operating in the batch mode. The device scanner changes the condition of this line to indicate to an IDCA the termination of an intput data transfer operation when the system is operating in the block mode. |
| IDL10/ IDL00 | Idle (OSB150Z) | The conditions of both the Idle and Release line are used to deactivate DCA's by switching them from the on-line or other active state to the idle state. Both lines when switched to the same state will switch an IDCA from the on-line state to the idle state When the idle line is in a predetermined state, it will switch an ODCA in either the on-line or audit trail mode, which has not generated a Ready response, to the idle state. ODCA's which have generated a Ready response are switched to the ready state. |

As previously mentioned, the device scanner 100 interconnects with the various other portions of the system through the terminal bus 150. The lines which comprise the bus are shown in FIG. 2 and a description of the function each line performs is summarized in the above mentioned table.

In general, the standard bus 100 includes all required data and control signals with the exception of power and indicator lines. The bus 150 represents the binary information by two direct current levels (i. e. two wire balanced system). Some of the lines are arranged for bidirectional transfers of information whereby a device may receive and transmit signals along the same line. More particularly, some (13) of the bus lines which are employed in transmit operations which as transferring information to the COMM DCA, IDCA's or ODCA's and are designated as follows:

1. OSB010Z through OSB040Z;
2. OSB080Z through OSB120Z;
3. OSB140Z through OSB160Z; and
4. OSB190Z.

Also some (14) lines including some of the above lines, are used for receiving information from the COMM DCA, PANEL and/or DCA's and these lines are designated as follows:

1. OSB010Z through OSB080Z;
2. OSB120Z through OSB150Z; and,
3. OSB170Z through OSB180Z.

Figure 3:
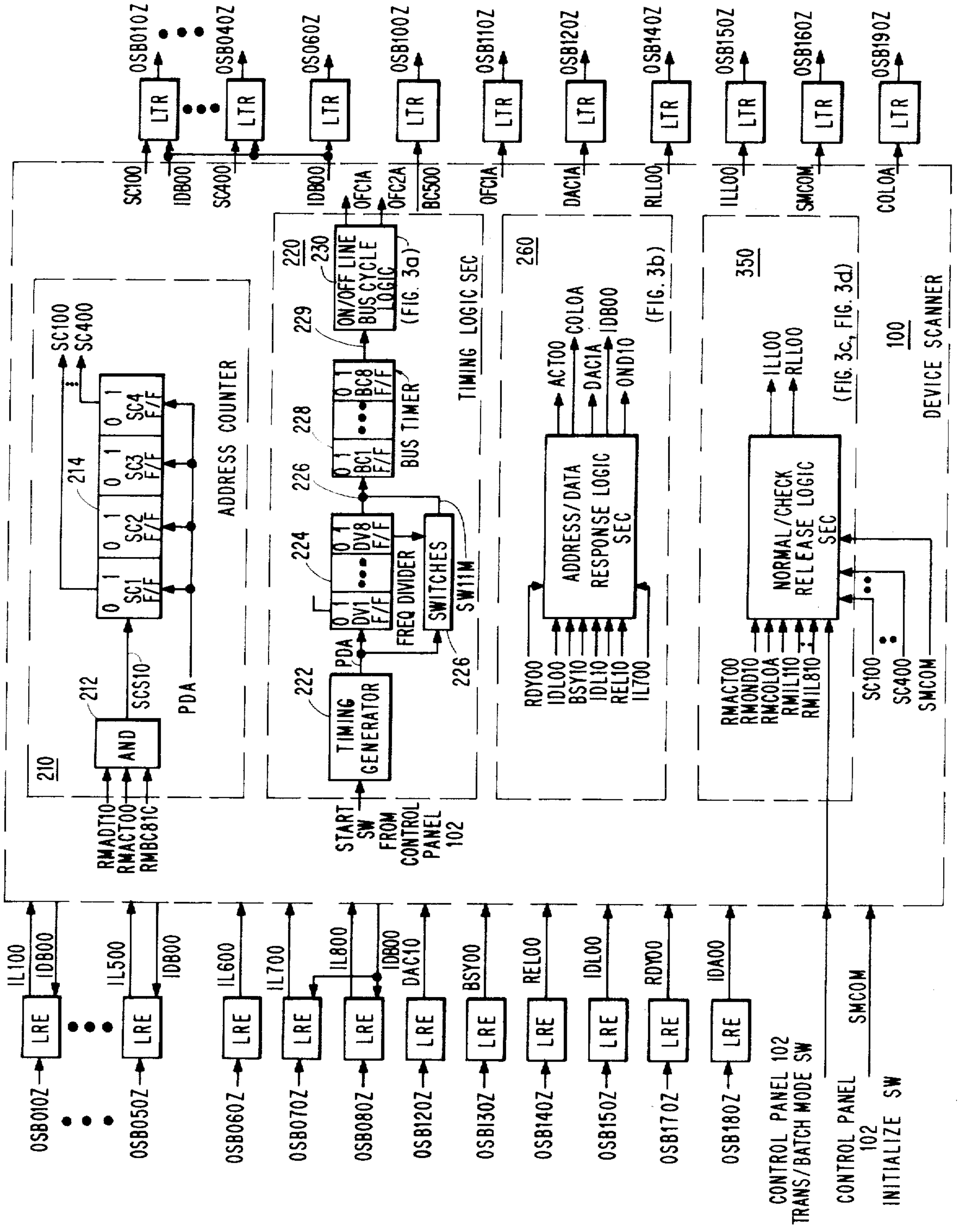
FIG. 3 is a block diagram of the device scanner of FIG. 1.

Referring to FIG. 3, it will be noted that each of the above transmit-receive lines are preceded and followed respectively by a block in the form of a logic circuit labeled LTR. This circuit, as shown, has a transmit or data input applied thereto and a gate input which determines whether the circuit operates as a transmitter or as a receiver. When operated only as a receiver, it is labeled as LRE. This circuit may be conventional in design and comprise a pair of differential amplifiers. Also, this unit may take the form of a driver/receiver circuit invented by Nelson W. Burke disclosed in a patent application titled "Bidirectional Line Driver-Receiver Circuit" bearing Ser. No. 863,807, assigned to the same assignee named herein.

Moreover, it should be noted that in as concerns the internal logic circuits of this system a binary ONE corresponds to a positive voltage level (e. g. +5 volts) while a binary ZERO corresponds to low voltage level (e. g. 0 volts). In the system when none of the devices connected to the bus, have enabled their transmitting circuits the bus lines are at a zero volts level. Accordingly, the internal logic levels are inverted before they are applied to the LTR circuit and they are inverted after they are received from an LRE circuit. Therefore, in this arrangement a binary ZERO is defined as a ZERO volts level on the bus and a binary ONE is defined as a negative voltage level (−2 volts).

The device scanner 100 as shown by FIG. 3 also receives inputs from a control panel 116. The controls which are important to the operation of the device scanner 100 include a BATCH/BLOCK switch and an INITIALIZE switch. As FIG. 3 shows, the BATCH/BLOCK switch when in the BLOCK position causes a function BAD10 to be generated while depressing the INITIALIZE switch produces the function SMCOM. For further details as to the other controls and indicators this panel could include, reference may be made to the article titled "H-2440 Remote Transmission Terminal" which appears in Volume Four-Number Two issue of the Honeywell Computer Journal, Copyright 1970.

Before referring to the logic diagrams herein, it should be noted that in order to facilitate the explanation of how various gates and storage elements are enabled and are switched, Boolean or logic equations are given either together with the logic circuits or in place of the logic circuits. It will be evident that these equations may be implemented using AND or OR gates or equivalents thereof wherein the dot symbol (·) indicates the use of an AND gate and the plus, (+) indicates the use of an OR gate.

It will be noted that most of the flip-flops disclosed are clocked or synchronous flip-flops and are designated by a diamond shaped block in the drawings. These symbols and other symbols for AND gates, OR gates amplifiers, inverters and storage devices are summarized in FIG. 6.

Figure 6:
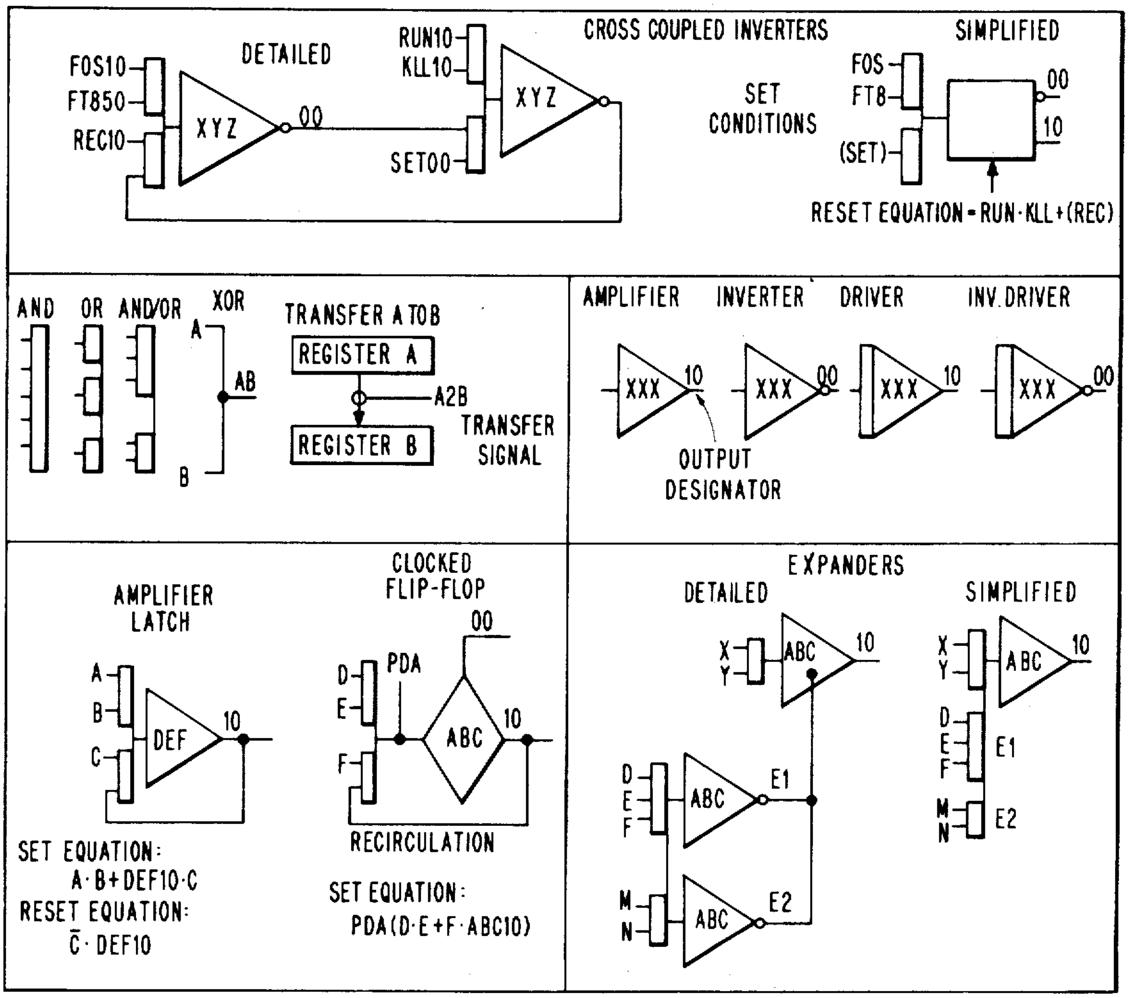
FIG. 6 illustrates a table of symbols used in the logic diagrams illustrating the invention.

Referring to FIG. 6, it will be noted that the set and reset equations are given for the various types of flip-flop storage elements (i. e. the clocked or synchronous flip flops and amplifier latch etc.) Further, it will be noted that the "ONE" output terminal of a flip-flop is designated by a 10 while the "ZERO" output terminal of the flip-flop is designated by a 00. Also, double lines and single lines are used in Figures to indicate single and multi-conductor lines respectively. Gating functions or transfer functions are designated by a circle around the conductor or conductors they enable.

The detailed logic for each of the blocks of FIG. 1 will be described in detail to the extent as is necessary to understand the present invention.

THE DESCRIPTION OF DEVICE SCANNER LOGIC SECTION

General

The device scanner 100 as mentioned establishes the timing for the system wherein it generates the "ON" and "OFF" lline bus cycles which define the time interval during which a single data character may be transferred over the terminal bus 150 during on-line and off-line operations. The "ON" and "OFF" LINE bus cycles are equally divided and can be varied in frequency by switches provided on a control panel 102 associated with the device scanner 100. Additionally, the scanner 100 is operative to generate a strobe pulse occuring midway between each ON-LINE and OFF-LINE bus cycle for defining a time period during which information on the bus 150 may be accurately sampled. Also, the scanner 100 generates a four bit binary address code which is received by the general device control area (GDCA) of the input/output device controllers 120, 130, and 140 and the communication device control area (DGDCA) of the COMM DCA 110.

With reference to FIG. 3, it is seen that the scanner 100 comprises four sections. These sections include a Device Scanner Address Counter Section 210, a Timing Logic Section 220, an Address/Data Response Logic Section 260, and a Release Logic Section 350. These sections are illustrated in greater detail in the FIGS. 3*a* through 3*d* as designated in each of the section blocks of FIG. 3.

DEVICE SCANNER LOGIC SECTIONS

Introduction

FIG. 3 shows the various function applied as inputs to the device scanner 100 and its major sections. Additionally, FIG. 3 shows the various output functions generated by its sections.

SCANNER TIMING SECTION

The device scanner 100 establishes the overall timing for the terminal system. The scanner's timing section as shown in FIG. 3 includes a Frequency Divider Logic Section 224, a Bus Clock Timer Section 228, and On/-Off Line Bus Cycle Logic Section 230.

The Frequency Divider Logic Section 224 controls the frequency, or more specifically, the time periods of the ON-LINE and OFF-LINE bus cycles. In the present system, each cycle is of the same duration and can be varied by switches from 100.8 to 403.2 microseconds.

It will be appreciated that the device scanner 100 time shares the standard bus 150 between the basic terminal operating modes (i.e. local transfers and remote transfers) by generating a continuing sequence of these ON-LINE and OFF-LINE cycles by switching of the state of the function RMOFCOO applied to bus line OSB11oZ.

This section includes a master oscillator and synchronous flip-flop divider network for generating in a conventional manner, the desired with clock pulses herein referred to as PDA pulses. The PDA pulses are fed to the various logic elements of the system for synchronizing the operation thereof.

Additionally, the PDA pulses are fed to a further divider network, the outputs of which are used to define the time duration of the aforementioned ON-LINE and OFF-LINE cycles. In its simplest form, the divider network includes a six bit synchronous counter including stages DV1 through DV6 which are resettable through switches connected at its various stages. Accordingly, different settings of these switches divide the input clock frequency by different amounts thereby establishing a number of different time intervals or periods for the ON-LINE and OFF-LINE cycles as described herein As shown by FIG. 3, the selected width pulse output of the Frequency Divider Logic Section 224 is fed along line 226 to the Bus Clock Timer Section 228. This section includes an eight bit shift register whose stages are designated BC1 through BC8 and whose outputs are used to generate the ON-LINE/OFF-LINE bus cycles, a bus cycle strobe designated as function BC500 and other timing functions including RMBC110, RMBC0100, RMBC310, RMBC410, RMBC510, RMBC610, and RMBC810 used for synchronizing the operation of the internal logic of the scanner 100. Accordingly, the logic section 228 divides each ON-LINE and OFF-LINE cycle into a number of time slots or intervals which are defined by the above mentioned functions. In greater detail, the normal bus cycle time of 50.4 microseconds is divided into two alternating periods of 25.2 microseconds. Each 25.2 microsecond period is divided by the Clock Section shift register into seven equal intervals of 3.6 microseconds. The timing function RMBC810 of the Bus Clock Timer is fed to the Bus Logic Section of FIG. 3*a*.

Figure 3A:
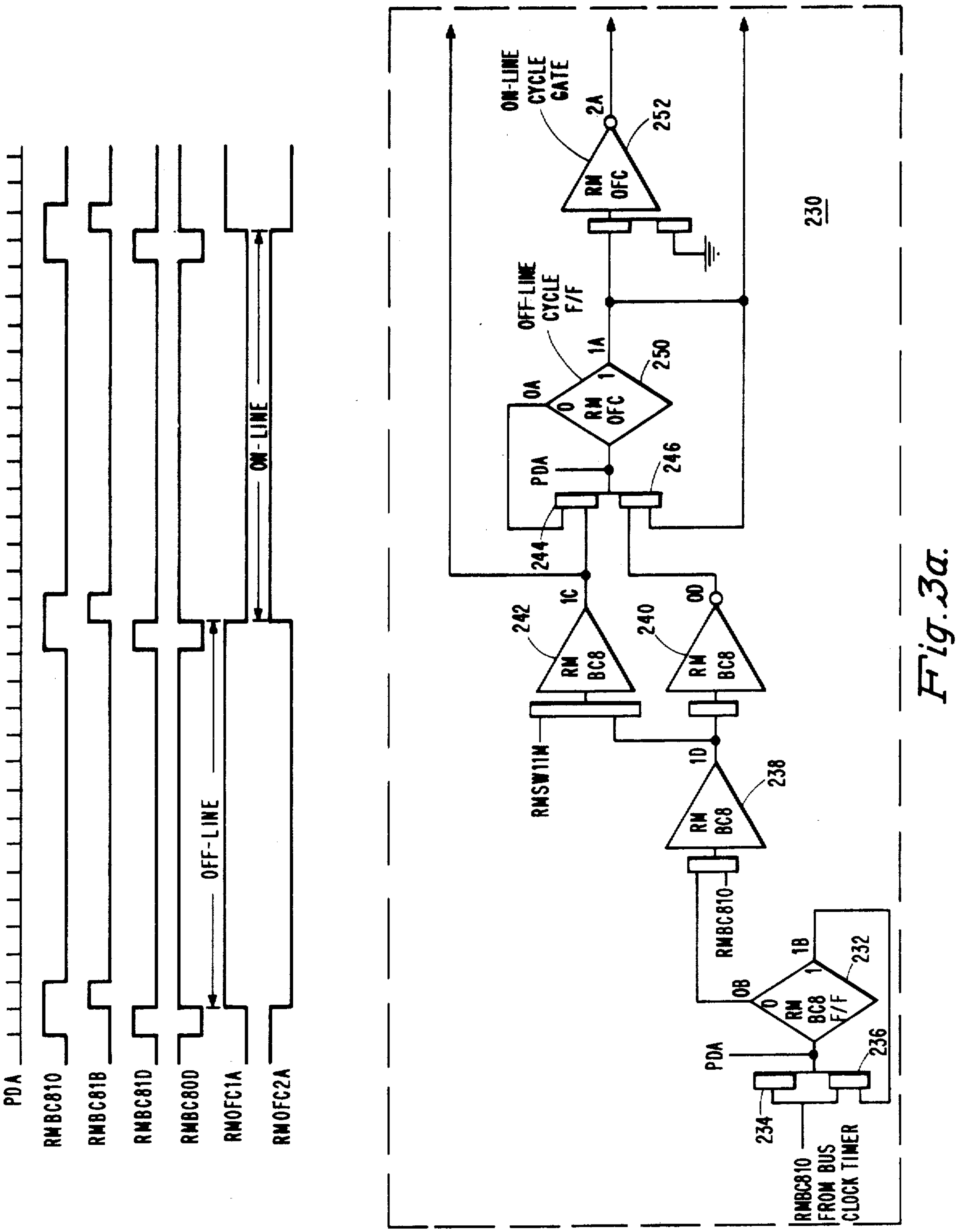
FIG. 3*a* shows in greater detail the timing logic section of FIG. 3.

As shown by FIG. 3*a*, the Bus Logic section 230 includes a flip-flop 232 with set and reset AND gates 234 and 236, and OFF-LINE/cycle flip-flop 250 with AND gates 244 and 246 gate buffer amplifier (GBA) stages 238 and 240, and gate buffer inverter (GBI) stages 240 and 252. In operation, when Bus Clock Timer section 228 forces the function RMBC810 high, applied via line 229, this resets flip-flop 232 to its ZERO state which generates the function RMBC80B. The presence RMBC80B and RMBC810 forces an output RMBC81D which stays high for one clock period or PDA when flip-flop 232 is set to its ONE state via its recirculation gate 236.

During normal operation, the divider switch is in a normal position which forces function RMSW11M high. The functions RMSW11M and RMBC810 enable AND gate 242 which in turn forces RMBC81C high which sets OFF-LINE cycle flip-flop 250 to its "ONE"

state. The function RMBC80D generated by recirculation gate 246 serves to hold cycle flip-flop 250 in its "ONE" state until it resets at the next time function RMBC810 comes high. The ON-LINE Bus cycle function is generated by inverting the "ONE" output RMOFC1A of the flip-flop 250. The timing relationships between the functions discussed above are as shown in the timing diagram of FIG. *3a*.

SCANNER SYSTEM ADDRESS LOGIC OF FIG. *3b*

General

When the terminal system operates "on-line," the device scanner 100 generates a 4 bit address code at outputs SC100–SC400 0f a four bit counter 214 as shown in FIG. 3. As FIG. 3 discloses, these outputs are applied as inputs to the interface circuits LTR-1 through LTR-4 and then to lines OSBO10Z, OSBO40Z respectively. The address counter 214 comprises four flip-flop stages designated SC1 through SC4 which are series connected to form a conventional shift register counter 214 which generates up to 16 different address codes within a complete operative cycle. By coding an additional bus line OSBO60Z as either a ONE or a ZERO so as to define either input or output device address code, the number of address codes is increased to 32.

The scanner address counter logic is continually advanced or incremented by a counter advance function SCS10 applied via an AND gate 212. In particular, when the Boolean logic statement RMADT10. RMACTOO · RMBC81C is satisfied, this activates the AND gate 212 which forces function RMSCS10 high. At this time, the bit counter 214 advances to the next highest address code upon the receipt of a clock pulse PDA during an address time interval of the ON-LINE cycle. The function RMADT10 defines the address time interval of the ON-LINE cycle (when counter incrementing occurs) and is generated by the logic 260 of FIG. *3b* as described herein. The scanner counter 214 stores this address contents until a following ON-LINE cycle at which time function RMSCS10 again comes high which increments the counter contents by one.

The generation of the advance function RMSCS10 is also conditioned by the fact that none of devices of the system have responded to the device address code applied to the bus lines during a previous address time interval of an ON-LINE bus cycle. This means that when either an input device or an output device responds to its address code, it forces address function RMADT10 high which in turn forces the output of an AND gate 212 low producing function RMSCS00. This function inhibits the incrementing of the address counter. Accordingly, the current four bit device address contents of the counter remained unchanged.

A portion of this logic generates function RMADT10 which establishes a time interval during which the device scanner 100 sends input device address codes over the bus 150 during ON-LINE cycles. From FIG. *3b*, it is seen that an address cycle occurs when function RMADT10 is forced high in accordance with the Boolean Statement: $RMOFC_2A$ · RMDACOO. The function $RMOFC_2A$ which defines an ON-LINE cycle is generated by the ON-OFF Line Bus Cycle Logic of FIG. *3a* as mentioned above. The function RMDACOO is generated by a data cycle flip-flop 300 as described herein below.

From FIG. *3b*, it is seen that the binary ONE output, RMACTIO, of the flip-flop 290 is applied to an AND gate 294 which generates an allow scanner to send data to bus function RMIDBOO. The state of this function deermines when the address information is applied to the bus lines and whether the address information is to be received by an input device or by an output device. In particular, when flip-flop 290 is in its reset state, it forces function RMIDBOO low which permits the address bit contents of the address counter 214 to be applied via their respective line driver circuits LTR1-LTR4 to the bus lines during "ONE-LINE " cycles (i.e. when function RMOFCIA is also low). when Active flip-flop 290 switches to its set or binary ONE state (i.e. indicating that there is an active input device IDCA or output device ODCA), it forces function RMIDBOO high which conditions logic to remove the address code from the bus lines.

It will be also noted from FIG. 3 that the aforementioned logic 260 by establishing a predetermined level to the line OSBO60Z conditions only input devices to decode the address code applied to the bus. That is, only when line OSBO60Z is in a predetermined state will input devices be conditioned to respond to their address codes. This arrangement allows the device scanner 100 to time share the bus between on-line and off-line system data transfer operations which involve input devices.

also during each address time interval defined by function RMADTIO, the AND gate 270 is operative to force an address response function RMRRSIJ to a ONE when a ready line funtion RMRDYOO is at a high level during a time defined by timer function RMBC310 (i.e. before the system devices sample the address code applied to the bus). This function activates an AND gate 272 which forces function RMRRSIN high which causes flip-flop 278 to be set to its binary ONE state.

It will be noted that a further address response AND gate 266 receives function RMRRSIP from an AND gate 269 which is enabled during time intervals BC510 and BC610. Additionally, the AND gate 266 also receives function RMADT10 together with a ready function RMRDY10. Normally the addressed device responds to its address code by switching ready function RMRDY10 from a low to high state during time RMBC510. Accordingly, AND gate 266 forces function RMRRS1C high which sets a flip-flop 276 to its ONE state via a gate 274 forcing funtion RMRRS1A to a ONE. The Scanner 100 generates an address or character response pulse to a change of state in the ready line when functions RMRRS1A and RMRRS1D are both ONES by activating an address or character response AND gate 282. This gate forces function RMRRS10 to a ONE which in turn permits function RMCOLOA to force the bus control line OSB190Z low during time RMBC610. The control Pulse produced serves to acknowledge the device's response to the address code placed upon the bus during that ON-LINE cycle. Both flip-flops 276 and 278 are reset at the beginning of the next bus cycle by timing function RMBC100.

Figure 3B:
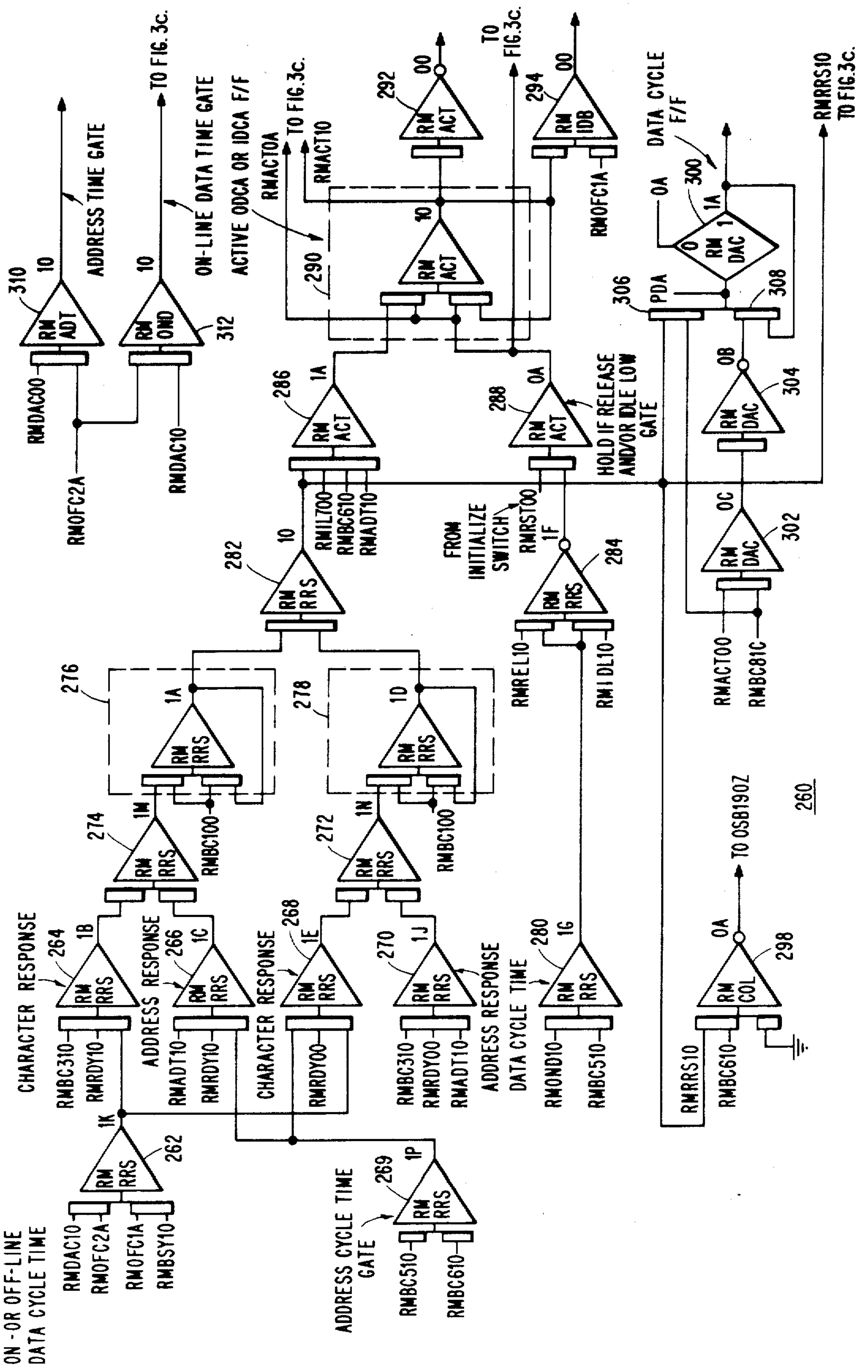
FIG. 3*b* shows in greater detail the address/data response logic section of FIG. 3.

Another portion of the logic of FIG. 3b establishes a period of time during which only data characters will be transferred over the bus 150 during "ON-LINE" and "OFF-LINE" bus cycles. This logic includes the data flip-flop 300 which is set to its ONE state in accordance with Boolean statement: RMDAC1A=RMRRS10· RMBC81C.

The flip-flop 300 is held in its ONE state by function RMDACOB which activates a hold AND gate 308. As shown, function RMDACOB is generated by amplifier gates 302 and 304 in accordance with the Boolean equation RMDACOB=RMACTOO·RMBC81C. Since this logic function is generated by the "NANDing" of functions RMACTOO and RMBC81C, the data cycle flip-flop 300 will remain in its binary ZERO state even in the presence of a set function RMRRS10 until the scanner 100 generates Device Active function RMACT10 when it detects a change in the ready function RDYOO producedby a system device in response to an address code.

Specifically, when a device responds to its address code function RMRRS10 comes high This causes active ODCA/IDCA flip-flop 290 to switch to its binary ONE state which in turn forces function RMACTOO low. When the function RMACTOO goes low, it forces the hold function RMDACOB high. Accordingly, at the next PDA pulse, the data cycle flip-flop 300 is switched from its binary ZERO state to its binary ONE state thereby producing function RMDAC10 which defines subsequent ON-LINE cycles as data cycles.

The DCA flip-flop 300 which will be held in its binary ONE state (i.e. a data cycle) until the scanner 100 receives a release (i.e. function RMREL10=1) during data cycle time (i.e. function RMOND10=1) and/or the terminal system is initialized (i.e. function RMRST00=0) by a switch on a control panel. At that time, flip-flop 290 resets to a ZERO forcing function RMACT00 high. At time RMBC81C, data cycle flip-flop 300 will be reset to its binary ZERO state by its hold function RMDACOB being forced low which deactivates gate 308.

It will be noted that the ONE output of flip-flop 300 is applied to the driver interface circuit of bus line OSB120Z. This function is monitored by the various devices of the system and its state defines whether the information is an address code or a data character. When function RMDAC00 is high the information on the bus is to be interpreted as address code and when function RMDAC10 is high the information on the bus is to be interpreted a data character.

In FIG. 3*b*, during data cycle time (i.e. when function RMDAC10=1) an AND gate 262 again is activated and forces function RMRRSK high in accordance with the Boolean equation: RMRRS1K=RMDAC10·RMOFC-2A+RMOFC1A·RMBSY10. Accordingly, function RMRRS1K in turn activates character response AND gate 264 when the ready function RMRDY10 is high during a time defined by timer generated function RMBC310. The AND gate 264 forces function RMRRS1B high which in turn sets the flip-flop 276 to its ONE state.

When all of the devices have accepted the data character applied to the bus information lines, ready function RMRDY00 switches from a low to a high state. This in turn forces function RMRRS1E high which forces function RMRRS1N high, and swiches flip-flop 278 to its ONE state. As described above the functions RMRRS1A and RMRRS1D together activate the AND gate 282 which in turn forces function RMRRS10 high. This activates gate 298 during time defined by timing function RMBC610 and produces a control pulse which is thereafter applied to bus line OSB190Z as shown in FIG. 3. The control pulse produced acknowledges the devices' responses to their acceptance of the data character placed on the bus to the input device.

In summary, the scanner 100 generates address and character responses via the data cycle time and address cycle time AND gates 262 and 272 as results of changes in state of the function RMRDYOO which causes the appropriate conditioning levels to be applied to the character response gates 264 and 268, and address response gates 266 and 270 respectively.

Figure 3C:
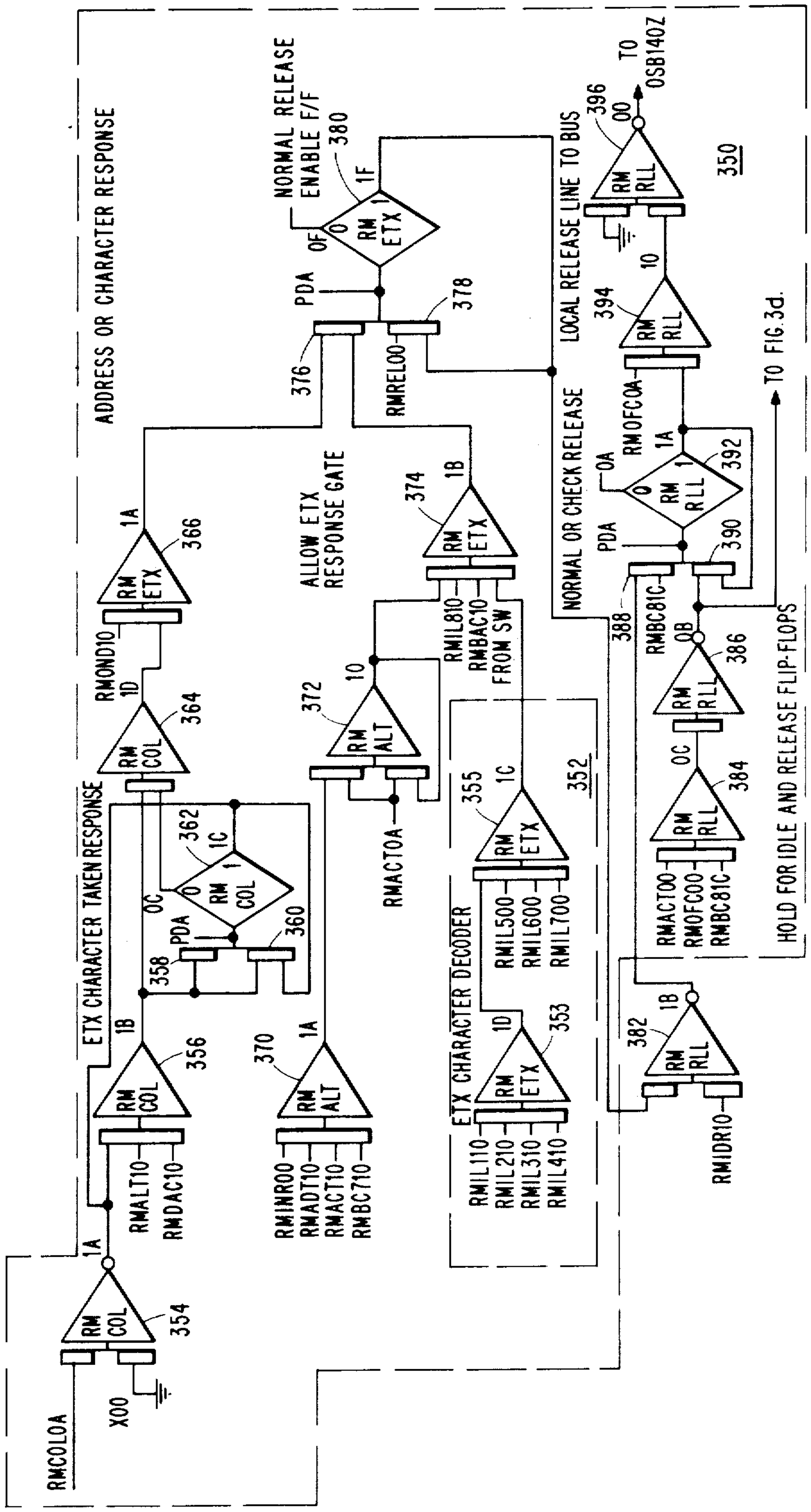
FIGS. 3*c* and 3*d* show in greater detail the normal check release logic section of FIG. 3.

SCANNER NORMAL RELEASE LOGIC FIG. 3c

When the system operates in the transaction (block) mode, the device scanner 100 is operative to detect the presence of a specially coded data character, an End of Text (ETX) character, which normally defines the end of a data block or segment. When all of the various devices of the system acknowledge receipt of the ETX character from the bus by causing a change in state in ready function RDYOO the scanner 100 generates a logic level on line OSB140Z which releases the input device which had been transferring data characters from the bus 150. The scanner 100 then increments its address counter 214 by one to the address code of the next input device to be addressed.

Referring to FIG. 3c it will be noted that when the above mentioned transction code is selected by placing the BLOCK/BATCH switch on the control panel to the BLOCK position it forces function RMBAC10 high. The AND gates 353 and 355 which comprise a decoder 352 will be enabled to decode the bits of an ETX character when received via bus lines 1L1 through 1L8. The function RMALT10 is a ONE when a flip-flop 372 switches to a ONE as follows. An Allow ETX Response AND gate 370 is forced to a ONE in accordance with the Boolean equation: RMALT1A=RM-ACT0A·RMACT10·RMINROO·RMBC710. The function RMINR00 can be considered to be a binary ONE since the function RMINR10 and its associated logic only inhibit the scanner 100 from generating a normal response when it senses an ETX character when the system is operating in certain on-line modes (e.g. device polling/mode/selection mode). These various modes are described in connection with above mentioned copending patent applications. The function RMALT1A in turn sets an Allow ETX Response flip-flop 372 to its ONE state, thereby forcing function RMALT10 high.

As shown in FIG. 3c, the function RMALT10 is applied as an input to a pair of AND gates 356 and 374 which generate the functions RMCOL1B and RMETX1B respectively. The function RM1L810 is a ONE when the parity bit of the ETX character is a ONE indicating correct parity. The function RMETX1B together with RMETX1A sets a Normal Release Enable flip-flop 380, to its binary ONE state.

The AND gate 366 which produces RMETX1A, as shown, receives the two input functions RMCOL1D and RMOND10. An On-Line Data Time function, RMOND10, comes high when an AND gate 312 of FIG. 3b is activated during data cycle (i.e. function RMDAC10=1) and during an ON-LINE bus cycle (i.e. function RMOFC2A=1). The AND gate 364 forces function RMCOL1D to a ONE when an ETX character taken Response function RMCOL1B comes high at a time defined by function RMCOL1C which comes high at the end of PDA pulse when flip-flop 362 switches to its ZERO state. Accordingly, functions RMCOL1B and RMCOLOC condition AND gate 364 to generate function RMCOL1D which is a clock pulse in width. This function when ANDed with function RMOND10 enables AND gate 366 to force the function RMETX1A to a ONE.

As mentioned previously, functions RMEXTX1A and RMETX1B enable AND gate 376 which switches the Normal Release Enable flip-flop 380 to its ONE state. This flip-flop remains in this state until its hold gate 378 is deactivated by function RMRELOO being forced low. The function RMRELOO goes low when either the release flip-flop 392 is switched to its binary ONE state or an input device generates a release response by forcing line OSB140Z to a ONE. The flip-flop 392 switches to a ONE when the RMETXIF of the Normal Enable Release flip-flop 380 comes high which activates an AND gate 382. This gate forces release function RMRLLIB high via AND gate 388 switching the release RMRLL flip-flop 39 to its binary ONE state. This in turn forces the output function RMRLL10 of AND gate 394 high which is inverted by a gate buffer inverter 396 and applied to line OSB140Z as function RMRELOO The input device which was transmitting data characters to the bus 150 will release itself in response to the change in state in this function as described herein.

Figure 3D:
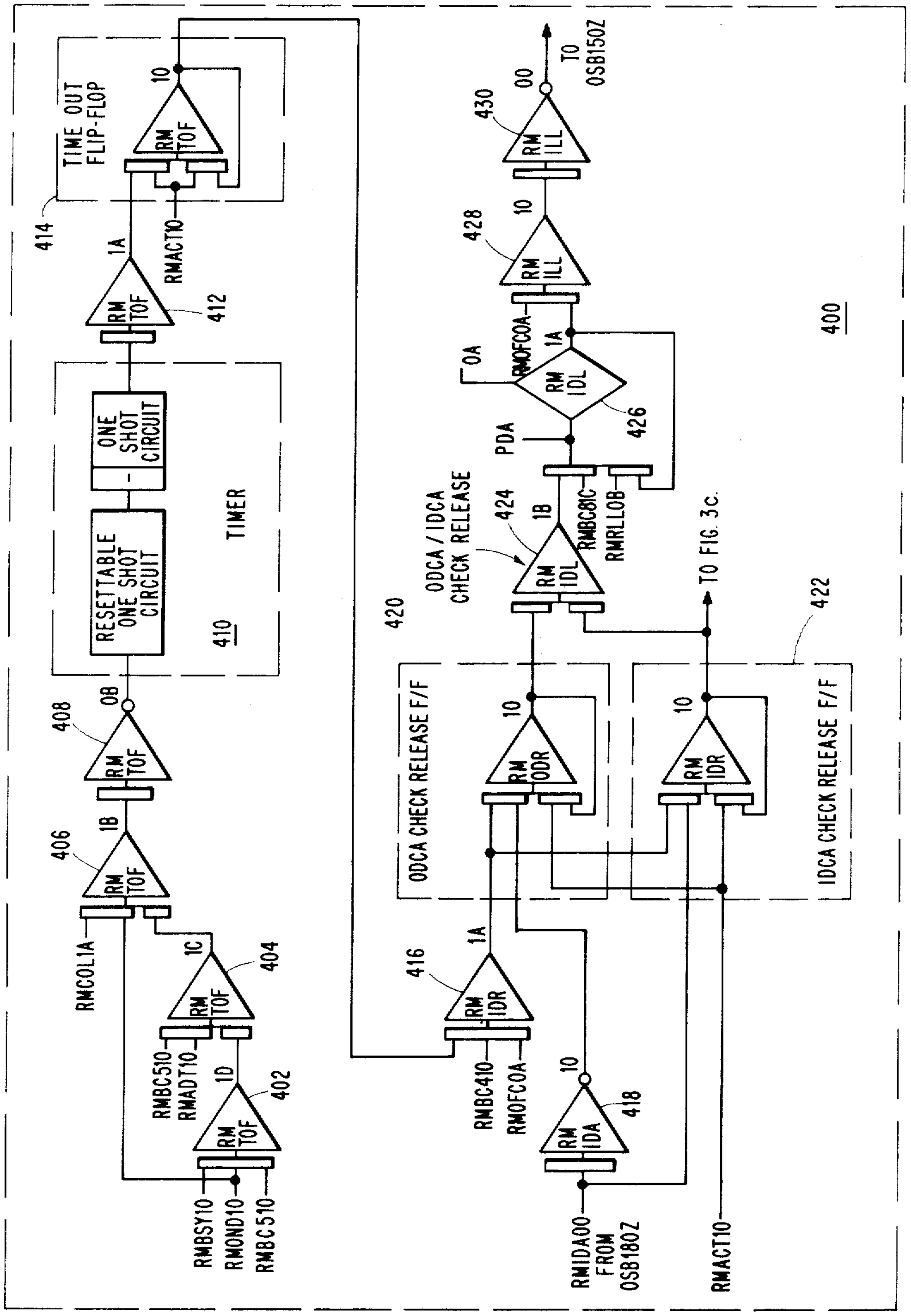

DEACTIVATION LOGIC SECTION OF FIG. 3d

General

The automatic device deactivation logic functions in either the batch or block (transaction) modes. This logic in combination with the scanner logic is able to detect failures in DCA's and their associated devices and automatically disconnect the DCA of the failed device from the bus 150.

Input device failures are detected by the absence of an input data signal to bus line OSB18OZ. When this absence endures for a predetermined time period, the scanner 100 generates function ILL00 and REL10 via bus lines OSB150Z and OSB140Z respectively to effectively disconnect the IDCA from the bus 150 by switching it to an IDLE state. While in this state, the IDCA and its associated device will not respond to its address.

The deactivation logic section detects output device failures by sensing the absence of a change of state in the signal level corresponding to function RDY10 to bus LINE OSB170Z. When this absence endures for a predetermined time period, the scanner logic circuits generate the function ILL00 on bus line OSB150Z to switch the ODCA to its idle state thereby disconnecting its associated device from the bus.

In greater detail, the device deactivation logic section is used to detect and respond to input and output device failures during ON LINE bus cycles. As mentioned, an input device failure is characterized by an input data line (IDAOO) function remaining high for a predetermined time period. An output device failure is characterized by the ready line remaining low for a predetermined period of time and the input data line IDAOO remaining low during the same period.

In Detail

As FIG. 3d shows, this logic comprises a timer circuit 410, a time Out flip-flop 414, an ODCA check Release flip-flop 420, an IDCA Check Release flip-flop 422 and Idle Check Release flip-flop 426. The timer 410 is enabled by pulses applied via a gate 406 and an inverter 408. In the present embodiment, the timer 410 can be adjusted to produce an output pulse when it does not receive another input pulse within 4 to 40 seconds. The timer 410 is conventional in design and comprises a resettable one shot circuit. It may also comprise the variable delay circuit disclosed in the U.S. Pat. No. 3,378,702 invented by Nelson W. Burke assigned to same assignee named herein.

As shown, the gate 406 has two sets of inputs. One set includes the on-line data time function RMOND10 and control line function RMCOL1A. As described herein, these functions are both ONES when all output devices have taken the character on the bus 150. The other set of functions are inputs to a gate 404. The functions RMADT10 and RMBC510 activate the gate 404 during the address cycle (i. e. when function RMADT10 is a ONE) at a time defined by pulse RMBC510. This insures that the timer 410 does not generate an output pulse while the scanner 100 is addressing devices. The functions RMBSY10, RMOND10 and RMBC510 activate an AND gate 402 during each data cycle (i. e. when RMOND10 is a ONE) when the bus 150 is not busy (i. e. when function RMBSY10 is a ONE) at a time defined by pulse RMBC510. This insures that the timer 410 does not generate an output pulse when there are no data transfers taking place.

The state of flip-flop 414 determines whether the timer 410 has timed out. That is, when the timer 410 generates an output pulse, it causes flip-flop 414 to switch to its ONE state when either an input device or output device is active (i. e. function RMACT10 is a ONE). The flip-flop 414 forces function RMTOP10 10 to a ONE. This enables an AND gate 416 when functions RMBC410 and RMOFCOA are ONES.

The AND gate 416 feeds the ODCA Check Release flip-flop 420 and IDCA Check Release flip-flop 422. As shown the function RMIDRIA is gated with function RMIDA10 and is applied to flip-flop 420. And, the function RMIDR1A is gated with function RMIDAOO is applied to flip-flop 422. The function RMACT10 is applied as a hold input to both flip-flops 420 and 422. It will be noted that the state of bus line OSB180Z determines which one of the flip-flops 420 and 422 will be switched to its ONE state when timer 410 generates an output pulse. The ONE outputs of flip-flops 420 and 422 are ORed by a gated 424 and applied to the set input of Idle Release flip-flop 426. When either flip-flop 420 or flip-flop 422 is a ONE, flip-flop 425 switches to a ONE at the end of a data cycle at a time defined by function RMBC81C. The function RMRLOB is applied as an input to the hold gate of the flip-flop 426. The ONE output of flip-flop 426 is applied to bus line OSB15OZ via an AND gate 428 and inverter 430.

It will be noted that the ONE out of flip-flop 422 is also applied as an input to gate 382 of FIG. 3c. Accordingly, when the bus line OSB15OZ is forced to a ZERO by flip-flop 422 having been switched to a ONE, the bus line OSB140Z is also forced to a ZERO by the function RMIDR10 switching the Release flip-flop 392 to its ONE state.

The next major areas of the system include the Device Control Area (DCA) and General Device Control Area (GDCA) which will now be described.

As illustrated by the system block diagram of FIG. 1, each device has a peripheral control unit termed a DCA which has a GDCA which includes logic for a standard interface between the DCA and bus 150 and a buffer memory. As shown by FIG. 1, the system includes several different types of device control areas and these are labeled IDCA, ODCA, and I/ODCA.

An IDCA provides logic, buffer storage, timing and interface circuits for communicating with the terminal bus 150 and controlling the operation of its associated input device. In particular, an IDCA includes logic operative to transfer information characters via its general device control area (GDCA) to the terminal bus for receipt by an output device or through the COMM DCA to either another remote transmission terminal or to a data processing system. Accordingly, the IDCA performs the following functions:

decodes and recognizes an address wired therein when applied to the bus 150 by the terminal scanner 100; acknowledges the receipt of an address code via a switching of ready function RMRDYOO;

loads a first data character from its associated buffer register on to the bus 150 and thereafter generates a data line signaling same;

places a next character into its buffer register upon detecting a predetermined control pulse (RMCONOO);

reads, transfers and ignores predetermined characters and;

switches to an inactive state in response to a level placed on the release line by the device scanner 100 when it detects an ETX character on the bus.

Output Device Control Area (ODCA)

The ODCA similarly provides timing, storage, logic and interface circuits for transfers between the standard bus and its associated peripheral device. It performs logic functions comparable to the IDCA with the exception that it performs them for an output device. Therefore, the ODCA accepts a data character when the device scanner places a bus strobe on the appropriate line and it signals via ready line function RMRDYOO when it is conditioned to receive the next character and thereafter stores the received data character in its memory.

Input/Output Control Area (I/ODCA)

The above unit can be considered as a combination of an IDCA and ODCA. It is used as both an input device control area and an output device control area. Whether it operates as either an input or output device is established by the state of bit 6 of the device address code placed on the bus together with the setting of an associated function switch. In particular, when bit 6 is a binary ONE, the I/ODCA will function as an IDCA. And, when bit 6 is a binary ZERO, it operates as an ODCA.

General Device Control Area (GDCA) Logic

Figure 7:
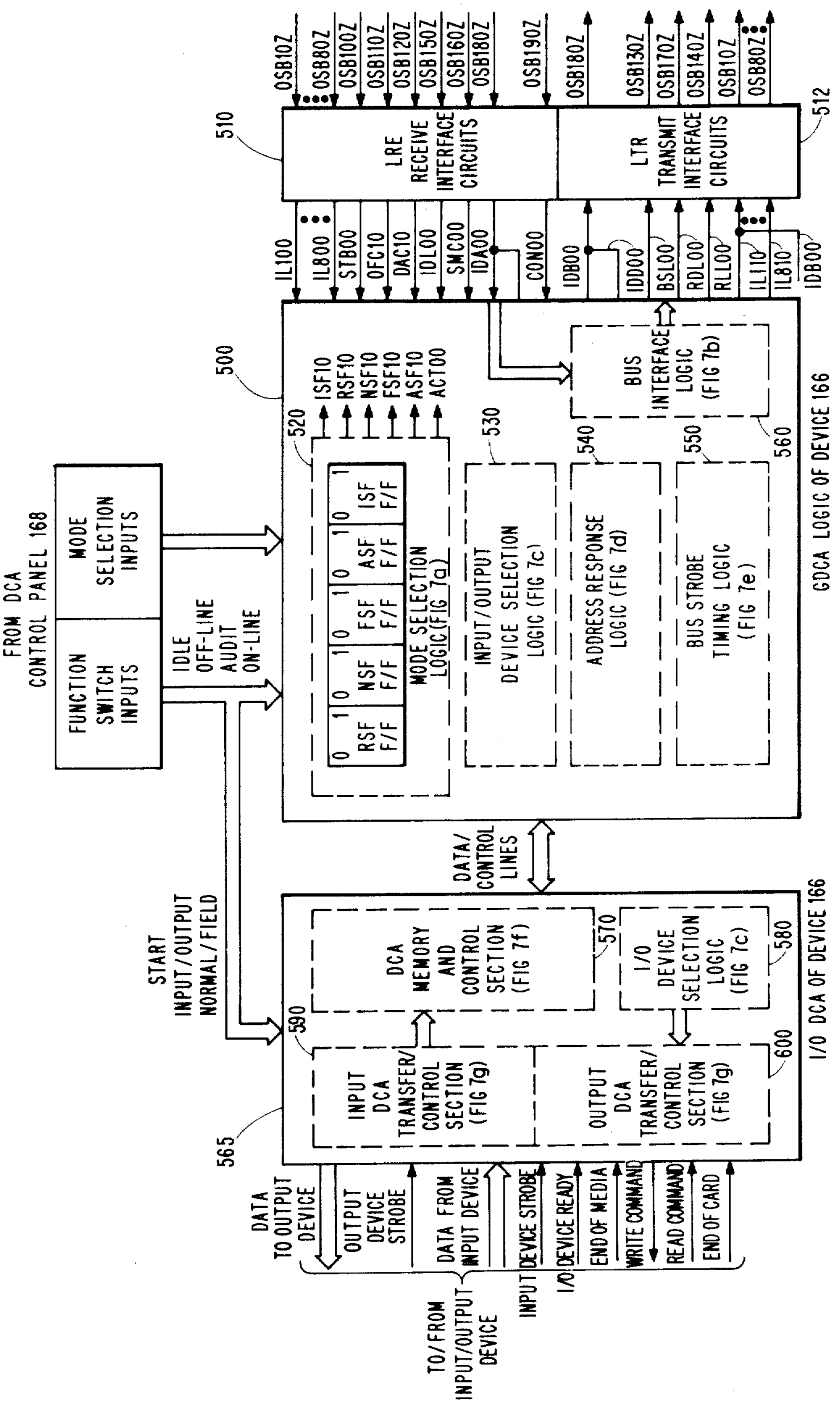
FIG. 7 is a block diagram of one of the Device Control Areas of FIG. 1.

Each DCA, as mentioned, has a GDCA section which provides a uniform logic interface to the terminal bus 150. FIG. 7 illustrates in block form the pertinent sections of the GDCA logic. As shown, the GDCA includes a Mode Selection State Logic Section detailed in FIG. *7a*, an Address Response Logic Section detailed in FIG. *7d*, Input/Output Device Section Logic detailed in FIG. *7c*, Bus Strobe Timing Logic detailed in FIG. *7e*, and a Bus Interface Logic detailed in FIG. *7b*.

In some instances, the logic of the various portions of a DCA has not been separated as this would require additional references to other Figures. Therefore, the following mnemonic prefixes have been used for logic functions generated by the various portions of the system for denoting that portion which generated same. The prefixes used are:

OS=Standard Bus Signal Lines;
IF=GDCA Internal Logic Functions;
IG=GDCA to Bus or to Control Panel Interface Logic Functions;
IH=Bus to GDCA Interface Logic Functions;
RX=DCA Logic Functions; and,
RP=Peripheral Device Logic Functions.

MODE SELECTION LOGIC OF FIG. *7a*

General Description of Device Operational Modes

It will be noted that FIG. *7a* discloses the storage and the logic which establishes the various operating modes, as well as states, for a GDCA.

The GDCA can operate in one of several modes depending upon the position of a control panel mode selection switch and bus conditions. A mode switch is associated with each peripheral device. With the mode switch in conjunction with a START button, an operator can select among the operating modes available to a particular device. These modes are defined by the states of clocked synchronous flip-flops of FIG. *7a*. These flip-flops may be arranged to drive indicator lights which display the status of each of the devices operating. The operating modes and states and their respective functions are:

| | Modes | Functions |
|---|---|---|
| (1) | Idle | =IGISF10; |
| (2) | Ready | =IGRSF10; |
| (3) | On-Line | =IGNSF10; |
| (4) | Off-Line | =IGFSF10; and |
| (5) | Audit Trail | =IGASF10. |

Figure 4:
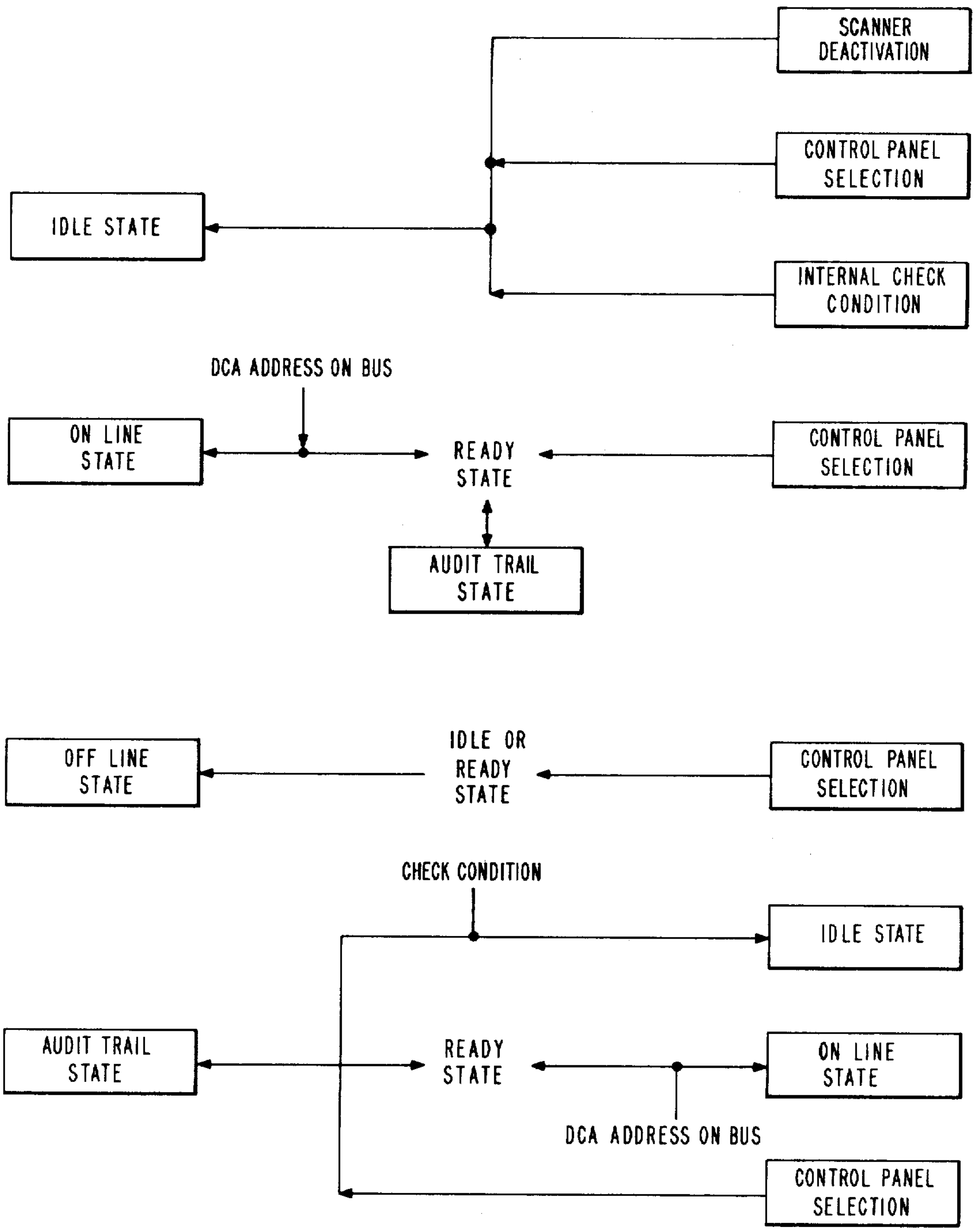
FIG. 4 is a flow diagram illustrating the operating state selection of a typical device controller of FIG. 1.

The sequence of states for establishing the operating modes for the various DCA's are illustrated in the flow diagram of FIG. 4. With reference to this Figure, the operational states will now be described briefly. The GDCA switches to the idle state when an operator manually selects the idle position on the control panel mode switch or the GDCA detects an internal check condition. When a device is in the idle mode, AC power is removed from the device and the device is unavailable for either on-line or off-line processing. Hence, while in the idle mode, the device can be considered as being in an inactive state. Accordingly, when addressed, the device will signal busy via bus line OSB130Z.

By contrast, when in the on-line, off-line or audit trail, the device can be considered in an active state.

Prior to entering the on-line mode, the device first switches to the ready state. This state is an intermediate state which is entered when the operator sets the mode switch to the On-line position and depresses a START button. Also, as FIG. 4 illustrates, the GDCA switches to this state when it completes a data transfer when it receives a normal release from the scanner 100. When in this state, AC power is applied to motors associated with the device. This state permits the device to be polled or selected via its GDCA prior to entering the on-line mode. That is, with a function switch set to the on-line position the GDCA upon detecting its address code will switch to the on-line mode.

As mentioned, the GDCA switches to the on-line operation state when it detects its address code on the bus. Additionally, the device may enter the on-line state from the audit trail state when the mode selection switch is in the audit position and the devices address code appears on the standard bus as indicated by FIG. 4.

In the on-line mode, the IDCA/ODCA transfers and accepts respectively data and control characters only during ON-LINE bus cycles.

As FIG. 4 illustrates, the GDCA may terminate on-line mode operation under the following conditions:

1. When the device scanner 100 generates a level on the release line and the DCA generates a ready signal, the DCA switches from the on-line to the ready state;

2. In response to internal check conditions or upon the receipt of a release from an input device, the DCA switches from an on-line to the idle state; and, 3. When the DCA receives a release signal and generates a ready response, it switches from the on-line state to the audit trail state.

Similarly in the off-line mode, the IDCA/ODCA transfers and accepts respectively data and control characters only during the OFF-LINE bus cycles.

As indicated by FIG. 4, the DCA enters the off-line state when the mode switch manually selects the off-line position while it is in either the idle state or ready state. Also, upon receipt of a ready signal followed by a bus release signal, the DCA when in audit trail state switches to the off-line state. The GDCA terminates the off-line state when another state is selected by the mode switch and when the DCA generates a ready response. While, in this mode, an IDCA can transfer data to one or more ODCA's and their associated devices when each ODCA is set to the off-line mode.

Additionally, when in the audit trail mode, output devices through their respective ODCA's can monitor and accept all data characters which are applied to the bus. This state is manually selected and is only utilized by output device control the areas (ODCA's) and their associated devices. And, when its address code appears on the bus, the ODCA responds with a ready signal and then enters the on-line state. The mode switch may be used to switch the ODCA from the audit trail mode to any other operational mode. Switching occurs when the ODCA receives a ready signal from its device.

The ODCA will switch from the on-line state to the audit trail mode following its receipt of a release response and a ready response from the bus. Also, the ODCA will terminate operating in the audit trail mode upon sensing a check or error condition at which time it will switch to the idle mode.

FIG. 5 shows in greater detail, the pertinent control functions, their states and changes therein for the above-mentioned change in modes. These functions provide inputs to the logic and state storage of FIG. 7*a*. They will be discussed in greater detail with respect to this Figure.

Bus Interface Logic Section-Figure 7*b*

This section includes the Bus Input Data Line transmit logic block 751 for input and output devices respectively. The transmit logic shown in block 751 includes a pair of inverter amplifier gates 752 and 756 operative to generate functions IFIDBOO and IFIDDOO for an input device as defined by function IGINPIO as described herein. When an input device places a character on the bus 150, it forces functions IFIDBOO and IFIDDOO low. This forces line OSB180Z to a ZERO which enables the IDCA to apply a data character from its memory to the bus lines OSB010 through OSB090.

The logic of block 761 generates a transfer function IHSTL10 for an output device in response to function IFIDA10 being switched to a predetermined state. In particular, when an active IDCA transfers a data character to the bus lines, it forces the Input Data Line function IFIDA10 high by forcing line OSB18OZ to a ZERO. The function IFWBT10 comes high in accordance with the Boolean equation: IFWBT10=IFDRF1C·IFOFCOO+IGFSF10·IFOFC10. This function defines the "working bus time" for each ON-LINE and OFF-LINE bus cycle during which the actual data character transfer occurs within each DCA.

The bus data line receive logic 761 for an output device in response to the presence of function IDAOO, forces function IGGSTIO high by activating an AND gate 762 which in turn generates transfer function IHSTLIO when output device functions RXPOSIO, RXCLDOO and RXPDYIO are all ONES. The Boolean equations for each of these functions are given in the FIG. 7*b*.

Further, this section includes logic blocks 770 and 780 for generating a bus busy response and ready response to bus lines OSB130Z respectively. A state of the function applied to line OSB170Z indicates whether the addressed DCA has been activated. The DCA devices when addressed in a ready or audit trail state respond by changing the state of ready function IFRDLOO. In particular, amplifier gates 778 and 786 together with flip-flop 784 condition bus line OSB170Z via inverter amplifier gate 782 to signal a ready upon decoding its device's address code applied to lines IF1L100 through IF1L600. The function IFBSR1A generated by an AND gate 788 comes high when there are no check or error conditions (IFCHHOO=1), during an address cycle time (IFDACOO=1) portion of an ON-Line cycle (IFOFCOO=1) and when its address response (ARF) flip-flop 982 of FIG. 7*d* is set to its ONE state (IFARF10=1). If the device is in either its ready state (i. e. 16RSF10=1) or audit trail state (i. e. IGASF10=1), function IFARL10 comes high in turn switching flip-flop 784 to a binary ONE. This in turn forces function IFRDLOO from a high to a low state and this function is applied to line OSB180Z. The ARL flip-flop 784 switches to a ZERO during the following OFF-LINE cycle (i. e. function IFOFCOO=0).

The GDCA logic 780 also generates a ready response for an output device via OSB170Z via gates 792 and 790. That is, the response is generated for each data character accepted by a selected output device (IFDRL1A=16OUT10), during the working bus time (IFWBT10=1) of a data cycle (IFDAC10=1) when the ODCA previously in a condition to ready to receive a data character (IFDRF10=1) completes writing the data character from the bus 150 into the memory (IFDRF10=0). This causes function IFRDL to be switched from a high to low state switching the ready line from a high to low state. Also, the logic 780 includes a transfer gate 794 which enables the IDCA of a selected input device to apply a data character read from its memory to the bus. That is, when the DCA is selected to operate as an input device and has read a data character from its memory (IFDR10=1), it will activate an AND gate 794 to force output to transfer function IFOTB1A high. This enables the IDCA to apply a data character stored in its buffer register to the bus 150.

When the DCA is in either an off-line or idle state as defined by functions IGFSF10 and IBISF10 respectively, it will generate function IFBRS10 via an AND gate 778 which in turn forces bus line OSB130Z low. This allows the device to respond busy when the scanner 100, places its device address code on the bus. Additionally, the GDCA also generates a busy response via gates to the address code of an input device (IGINP10=1) when the input device is in the off-line state (IGFSF10=1).

Another group of logic circuits in FIG. 7b include a Normal Release Memory flip-flop 806 and a Check Memory Release flip-flop 820 with associated logic gates. The ONE output of both flip-flops are fed to the mode state logic section of FIG. 7*a* and will cause the state of the active DCA to be changed when the functions IFRELOO and IFIDLOO are forced to predetermined states by either the device scanner 100 or the active DCA itself.

In greater detail, when either the release function IFRELOO or idle function IFIDLOO is forced low, it activates an AND/OR gate 810 which produces function IFNRMID. And, during an ON-LINE bus cycle (IGOFCOO=1) upon the receipt of a strobe pulse (IGSTB3C=1), IFNRM flip-flop 806 switches to its binary ONE state. This forces function IFNRM10 high which in turn forces function IFNCR10 high by activating a pair of gates 804 and 802.

The logic circuits which process signals from its associated input device as for example a card reader, indicating when it is out of media (e. g. cards) are also shown in block 870 of FIG. 7*b*. Here, the card reader device generates a function RPOFFOO when it senses a hopper empty condition establishing the above mentioned end of media indication. Referring to this Figure, it will be noted that an out of form (IHOOF) flip-flop 890 is initially switched to its ZERO state by an initialize function RXSTA30 when the device DCA is in its idle state (IGISF10=1). Accordingly, upon receipt of the end of media function RPOFFOO from the card reader device, IHOOF flip-flop 890 switches to its binary ONE when the last character stored in its memory (RXEOD10=1) applied to the bus 150 has been accepted (IGNEC10=1) by all of the output devices.

In greater detail, a function RXOFB10 when ANDED with RXOFF10 by gate 886 forces the gate 886 output high switching flip-flop 890 to its ONE state. When IHOOF flip-flop 890 switches to a binary ONE, function IHOOF10 comes high and activates an AND gate 848 producing function IFRLF1A which sets IFRLF flip-flop to its ONE state. Thereafter, in the manner described above, the bus logic 840 is conditioned to generate the release function via bus line OSB14OZ.

It will also be noted that functions IGACTOO and IHOOF10 when both ONES activate gate 856 forcing check function IGCHH10 to a ONE which forces function IFCHHOO to a ZERO. Additionally when a check function IFCHF10 derived from the one side of a check flip-flop (not shown) is forced to a ONE, by the detection of certain error conditions (i. e. a memory parity error, all state flip-flops are ZEROS and a strobe pulse signal is sensed, the device error checks or by the device scanner deactivation) function IGCHH10 is also forced to a ONE. The functions IGCHH10 and IFCHHOO feed certain portions of the selection logic blocks of FIGS. 7*a* and 7*c*. As described herein, these functions condition the above-mentioned logic blocks to inhibit further processing by the device control logic sections in the presence of error conditions. If when the function IFREL10 is forced to a ONE, the function IFIDL10 is also forced to a ONE, an IDCA (i. e. function IGINP10=1) will switch Check Release flip-flop 820 to a ONE via gates 824 and 822.

When functions IFRELOO and IFIDL10 are ONES, an ODCA (i. e. function IGOUT10=1) will switch Check Release flip-flop 820 to a ONE via gates 824 and 822. However, function IFIDL10 will not switch Memory Release flip-flop 806 of an ODCA via gate 810 because function IFINP10 is a ZERO.

An AND gate 828 is activated during an OFF-LINE cycle to switch flip-flops 806 and 820 to their ZERO states when its associated DCA has been switched to the idle state (IFISF10=1), or the audit trail state (IGASG10=1) or to the ready state (IGRSF10=1). Switching is accomplished when the above functions force function IFNRMOC to a ZERO which inactivates the hold gates of flip-flops 806 and 820.

Input/Output Device Selection Logic of FIG. 7*c*

This logic is shown as block 960 in FIG. 7*c* and determines whether its associated I/O device is to operate as an input device or as an output device during ON-LINE and OFF-LINE bus cycles. As shown, this is established by pairs of jumpers 945 and 966 and the position setting of the Input/Output device function switch on the I/O Device's Control Panel.

When the I/O DCA is selected to operate as an IDCA, the Panel Function switch and jumpers function place IFOUT1J at a binary ZERO and function IFINP1J at a binary ONE. The IDCA is activated in either the idle state IGISF10=1 during an OFF-LINE cycle (IFOFC10=1) when a Bus Strobe (IGSTB1C) is present. Specifically the ANDing of functions IFOFC10, IGSTB1C, and IGISF10 force function IFINP1B to a ONE which sets Allow Active as Input Device (IGINP) flip-flop 942 to its binary ONE state. At the same time, an inverter gate 964 inverts the high output of jumper card 966. This inhibits an Allow Active as Output Device (IGOUT) flip-flop 962 from being switched to its one state during the same OFF-LINE cycle. The I/O DCA is selected to operate as an IDCA from a remote source, e.g. the COMM DCA, as follows. It will be noted that the Function switch position for IDCA and ODCA remote selection causes both functions IFINP1J and IFOUT1J to be binary ZEROS.

When the IDCA is in its on-line state (IGNSF10=1), an AND gate 946 becomes active forcing function IGREM10 to a ONE when neither flip-flop 942 nor 962 are in a ONE state, this causes IGINP flip-flop 942 to be switched to its ONE state when bit 6 of the device address code is a ONE (i.e. IFIL610=1) as mentioned.

When the I/O DCA is to operate as an ODCA, the jumpers are wired in an opposite fashion so that during an OFF-LINE cycle, the IGOUT10 flip-flop 962 is set to a ONE in accordance with the equation: IGOUT10=IFOFC10·IGSTB1C·IGISF10·IFINPOA.

As concerns remote selection, when the DCA is in an on-line state, IGOUT flip-flop sets in accordance with the equation:

IGOUT10=IFNSF10·IFIL600·IGREM10. That is, when the DCA is in its ready state IGOUT flip-flop sets to its ONE state when bit 6 of the address code is a binary ZERO.

Some of the logic of Input/Output Selection Logic discussed above feeds the input/output logic of the I/O DCA shown as block 900 in FIG. 7c. This logic includes a Data Ready for transfer IHDRY flip-flop 906 and associated logic in addition to a Device Ready (IFDRF) flip-flop 920. The IHDRY flip-flop 908 switches to its ONE state under several conditions. These include when the DCA is selected by an operator to operate as an output device (IGOUT10=1) or the selection is remote wherein both input (IGINP) and output (IGOUT) flip-flop 940 and 962 are reset to ZEROS which forces function IGREM10 to a ONE, one of these function actuates a gate 910 forcing function RXDRA10 to a ONE. And, when either the peripheral device signals that it is ready (RXRDYOO is forced to a ZERO) and that certain control characters ETX, RS, or EM, have not been transferred to the bus or that the eighieth memory location has not been addressed (i.e. RXEOM1O=0) function RXPDY10 is forced to a ONE. These functions switch flip-flop 908 to its ONE state.

Additionally, IHDRY flip-flop 906 will also be switched to a ONE by functions RXDOC10 and RXDAR10. The function RXDOC10 comes high when an AND gate 916 is active as a result of the DCA being selected by an operator to operate as a card reader input device (IGINP10=1) and that either input device is not transferring data characters to the DCA memory or has completed its transfer (i.e. RXRSOOO=1) wherein data characters are being read out to the bus from memory. The function RXDOC10 together with function RXDAR10 which comes high at bit time 10 when bit 10 is a binary ONE (when the device function switch is in field position) or at bit time 8 (when the function switch is in a normal position) during a normal read data cycle, sets IHDRY flip-flop to its ONE state.

When flip-flop 906 is a ONE, an AND gate 904 forces a Device Ready to Data transfer function (IFDRD10 to a ONE) provided that there are no check or error conditions present (IGCHOO=1). The IHDRY 906 flip-flop is reset by function RXDRY 40 which is forced low by a gate inverter 912 when the system is initialized (RXSTA10=1) by either the start button on the control panel (IGEXC10=1) or by being released (IGRLF10·RXROS10) or when the scanner 100 generates a response via IFCONOO which forces function IGNEC10 high.

For an input device on-line transfer when the DCA is in its on-line state (i.e. function IFDRF1C=1) the flip-flop 920 switches to its ONE state each time its DCA has a character ready to transfer from its memory to the bus. That is, when functions IFDRD10 and IFINP10 are ANDed by an AND gate 918, function DRF1A comes high and sets flip-flop 920 at a time defined by functions STB3C and IFOFC10 (i.e. at strobe time IGSTB3C during an OFF-LINE cycle) when a flip-flop 922 is switched to its ONE state by these functions.

For an output device on-line transfer when the DCA is in either its on-line or audit trail state (i.e. function IFDRF1C=1) the flip-flop 920 switches to its ONE state when the gate 918 ANDing IGACT10·IGOUT10 forces function IFDRF1A to a ONE.

For off-line data transfer for both input and output device transfers, the flip-flop 920 switches to its ONE state via gate 918 which is activated under the conditions mentioned above when its DCA is in an off-line state (IGFSF10=1), when function IFFCD10 is a ONE.

The function IFFCD10 generated by the block 910 of FIG. 7c comes high during an ON-LINE bus cycle in accordance with the equation: IFFCD10=IGSTB3-C·IFOFCOO.

It will be noted that DRF flip-flop 920 resets to its ZERO state under four conditions. These are (1) when the system is initialized (IFRST10=1), (2) when its DCA is either in the on-line or audit trail state (DRF1C = IFNSF10+IFASF10·IFDAC10) and the scanner 100 signals that a data character has been accepted by all output devices (i.e. IFDRF1C·IFNEC10·IFFCD10=1), (3) when its ODCA is in the off-line state (IFFSF10=1) and a character has been accepted (IGNEC1-0·IFNCD10) and (4) by functions DRFOC and DRFOG which come high when there are no checks (IFCHHOO), the DCA is in its on-line state (IGNSF10), it is selected to operate as an output device (IGOUT10) and the character on the bus has been written into memory (IHCTN10=1). As shown, the function DRFOC comes high in accordance with the equation: DRFOC=IHCTN10·IFOUT10·IFFCD10. The so called character taken function IHCTN10=RXCLD10·RXLMR10·RXFSB10. The function IHCTN10 is a ONE when the character has been transferred from the bus (RXCLD10=1), a memory read/write cycle has been initiated (RXLMR10=1) and a final bit count has been reached (RXFSB10=1). And, the function IFDRFOG comes high in accordance with the equation: IFDRFOG=IFDRDOO+IFCHHOO.

GDCA ADDRESS RESPONSE LOGIC of FIG. 7d

The address response logic as shown in block 980 of FIG. 7d includes a jumper card 998 and an Address Response IFARF flip-flop 982 and associated logic gates. The jumpers on the card 998 are wired so as to assign a unique device address code to each DCA. When an address code on the bus corresponds to the GDCA wired-in address code, as decoded by AND gate 997, function IFADD1S comes high.

During the address portion (DACOO=1) of an ON-line cycle (IFPFCOO=1), the function IFADD10 comes high when an AND gate 990 is activated by the I/O Device Selection logic blocks 940 and 962 of FIG. 7c which signals either the remote or operator selection of an input or output device by generating either function IGREM 10 or function IFADD1Y. This in turn sets flip-flop 982 to its ONE state during an address cycle (IFDACOO=1) of an ON-LINE cycle (IFOFCOO=1) when the bus strobe function IGSTB3C is a ONE provided the addressed device is not busy (IFBSYOO=1).

However, when the DCA is in either the off-line or idle state, the GDCA will force function IFBSYOO to a ZERO which prevents the address response flip-flop 982 from being switched to its ONE state.

Figure 7E:
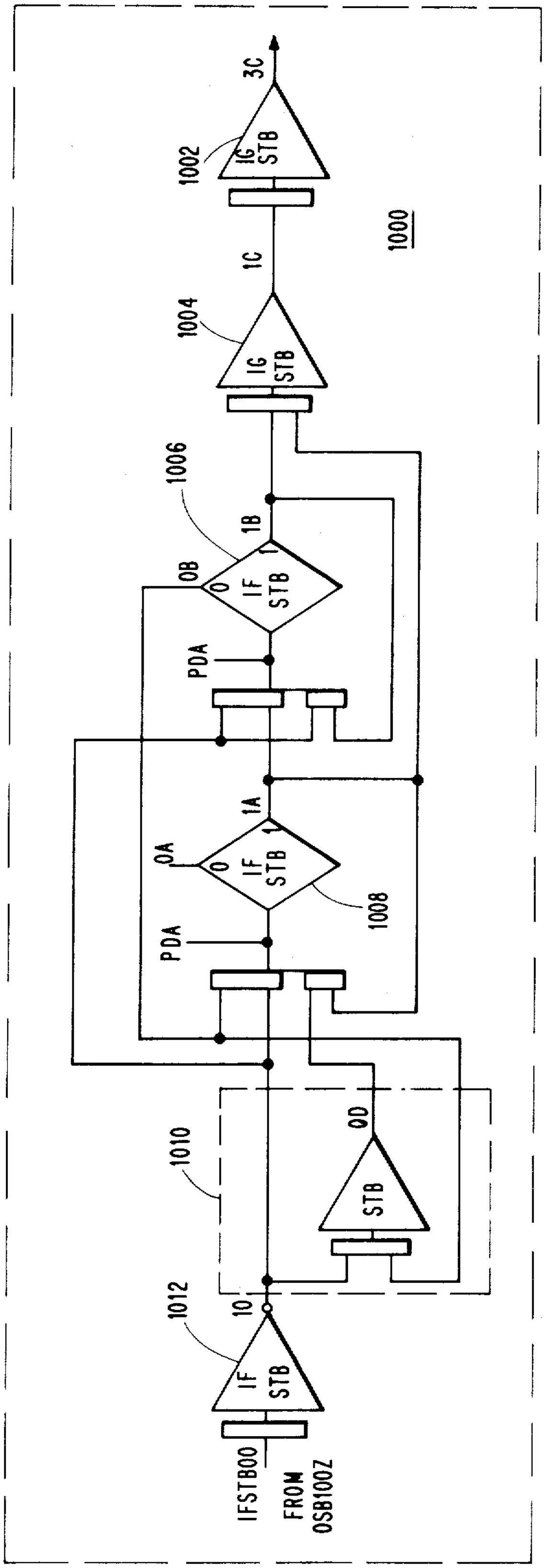
FIG. 7*e* shows in greater detail the Bus Strobe Timing Logic Section of FIG. 7.

BUS STROBE TIMING LOGIC OF FIG. 7e

FIG. 7e discloses the logic included within block 1000 for generating strobe pulses fo synchronizing the various data transfer operations performed by the GDCA and DCA logic in accordance with the ON-LINE and OFF-LINE cycles generated by the device scanner 100. As shown, this logic includes flip-flops 1010, 1008 and 1006 and associated logic.

The scanner generated strobe pulse STBOO derived from scanner timing function BC510 and applied from bus line OSB100 is inverted by an inverter 1012 and applied as a function ISFTB10 to the inputs of flip-flops 1010, 1008 and 1006. The leading edge of pulse IFSTB10 switches, flip-flop 1008 to a binary ONE during a next PDA pulse. When flip-flop 1008 sets, it forces function IFSTBIA to a ONE which switches flip-flop 1006 to a binary OE upon the occurrence of a next PDA pulse. The trailing edge of same PDA pulse also resets flip-flops 1008 and 1010 to their ZERO states. An AND gate 1004 develops strobe pulses IGSTBIC and IGSTB3C during the time that both flip-flops 1008 and 1006 are set to binary ONES. Accordingly, these pulses are a PDA Pulse in width and normally occur at an interval midway through each ON-LINE and OFF-LINE cycle. A cycle of operation is completed when flip-flop 1006 resets to a ZERO at the trailing edge of the bus strobe pulse IFSTBOO.

DEVICE CONTROL AREA

Figure 7F:
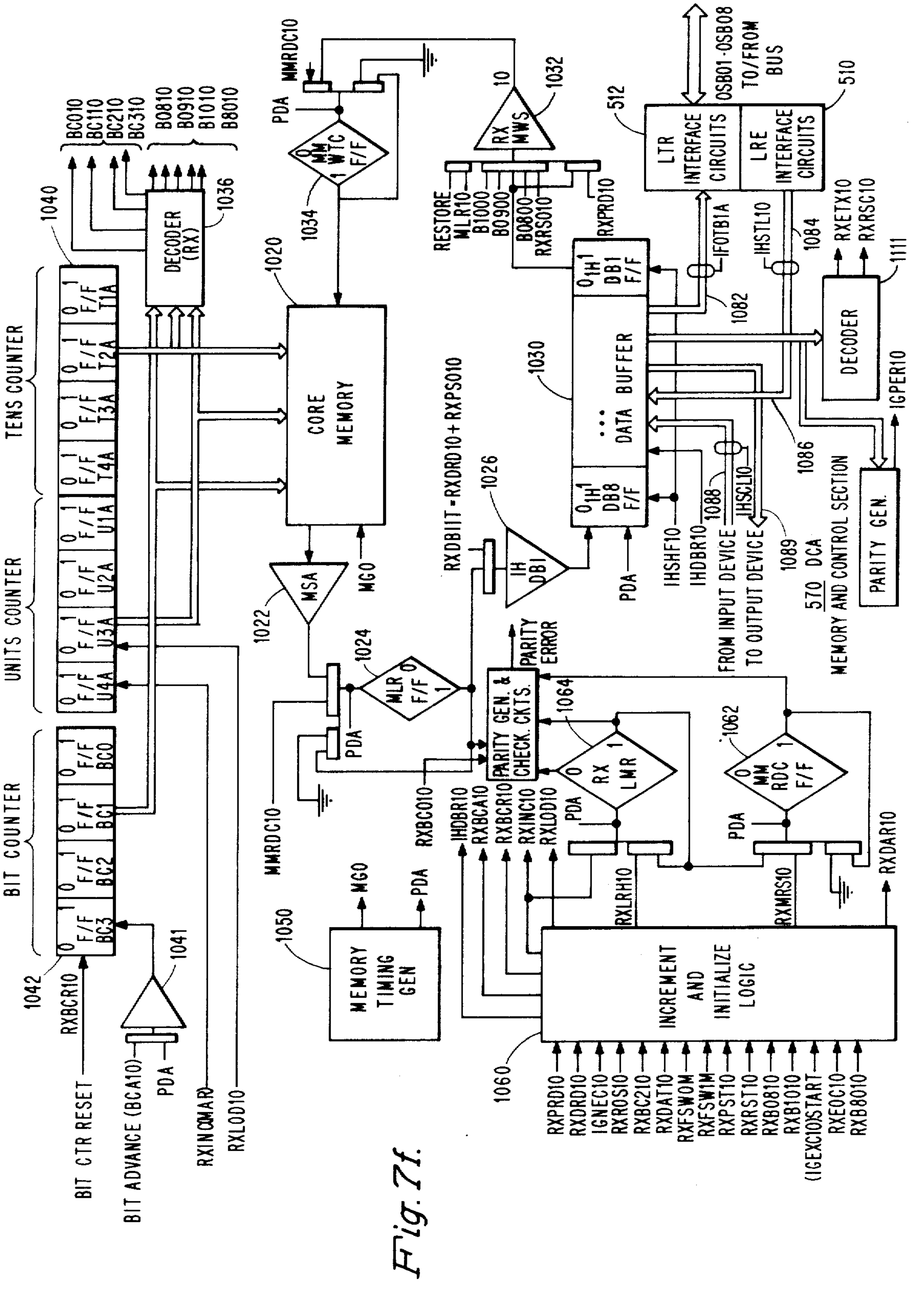
FIG. 7*f* shows in greater detail the Memory and Control Section of FIG. 7.
Figure 7G:
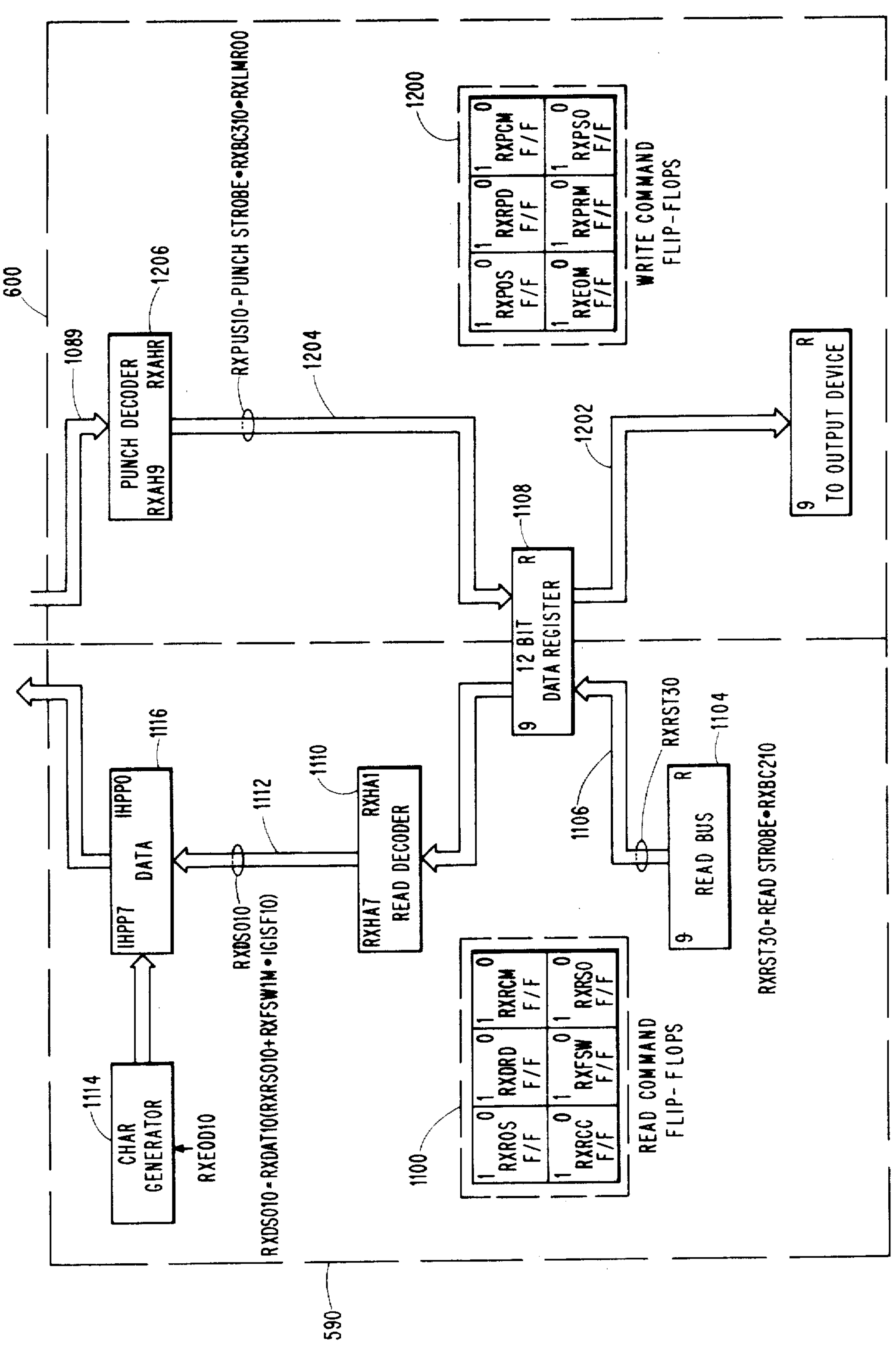
FIG. 7*g* shows the input and output transfer control section of I/O DCA of FIG. 7.

For the purpose of the present invention, the pertinent portions of the device control area of FIG. 7 for an input/output device are disclosed in greater detail in FIGS. 7*f* and 7*g*. It will be appreciated that the device control area (DCA) of either input device or output device is essentially equivalent to the logic of blocks 570 and 600 respectively of the I/O DCA of FIG. 7.

MEMORY AND CONTROL SECTION 570

FIG. 7*f* shows the memory and pertinent control logic for the DCA. The memory is a coincident current serial access destructive readout core memory 1020 which contains 200 character locations, each having 10 bits. A timing generator 1050 controls the DCA's memory timing and this unit is similar in construction to the timer unit of FIG. 7e described above. That is, it includes an oscillator which feeds a plurality of synchronous flip-flops arranged to generate a memory cycle function (MGO) for each memory cycle which consists of a read cycle (MMRDC10) followed by a write cycle (MMWTC10).

Memory addressing is accomplished by three counters designated as a bit counter 1042 and a units counter and a tens counter which contitute a memory address register (MAR) 1040 of FIG. 7f. The bit counter 1042 is a four stage counter whose flip-flop stages are designated BC010 through BC310. Its outputs feed a decoder 136 which generate from the counters contents, a number of timing functions including RXBCO10, RXBC110, RXBC210, RXBC310, RXBO810, RXBO910, RXB1010 and RXB8010. Some of these timing functions are used to transfer data characters between the Data Transfer Sections 590 and 600 and the memory 1020. Other timing functions as shown are used to gate the bits of character into an addressed memory location.

The bit counter 1042 is advanced via an AND gate 1041 by a bit counter advance function BCA10 at each PDA pulse and is reset by a bit counter Reset function RXBCR10. Under certain conditions described herein, the bit counter 1042 sequences through a portion of its count (i.e. counts 0–3), during which time it will cause the decoder 1036 to generate functions BCO10 through BC310 at counts of 0–3 respectively. These functions are used to initialize certain portions of the memory logic so as to synchronize memory timing with the transfer of data characters to and from the memory buffer register 1030 as required. When the bit counter 1042 sequences through only a portion of its count, this count will be referred herein as a fast count. When sequenced through its full count (1 through 10), the bit counter 1042 will cause the decoder 1036 to generate the timing functions BO810 and B1010 at counts of 8 and 10 respectively.

As mentioned, the units and tens counters are four stage counters which serve as the memory address register 1040 for the DCA memory 1020. As shown in FIG. 7*f*, the units counter includes flip-flop stages U1A10 through U4A10 and these stages are advanced by an increment function RXINC10 and are reset to all ZEROS by a function RXLOD10. The tens counter includes stages T1A10 through T4A10 which are advanced by one when the units counter reaches a count of nine (B0910) and when function RXINC10 is a ONE. The stages of the tens counter are also reset by function RXLOD10.

As shown by FIG. 7*f*, functions RXINC10, RXLOD10, and RXBCR10 are generated by the Increment and Initialize logic 1060 as described herein. The memory 1020 transmits and receives data characters to and from a number of transfer paths via its eight stage Data Buffer Register 1030. The register 1030 includes eight synchronous flip-flops series connected to form a shift register which is enabled for shifting by a function IHSHF10 generated by the device DCA as explained herein. It will be appreciated that the register 1030 operates as a parallel to serial converter for operations involving transfers from a data source (i.e. the card reader device or bus) to the memory 1020. And, the register 1030 operates as a serial to parallel converter for operations involving transfers from the memory 1020 to a receiving device (the punch device or bus). The transfer paths include an Input device path 1088, an Output device path 1089, and the bus transfer paths 1082 and 1084.

In general, a memory cycle is initiated when function RXINC10 is forced to a ONE which resets the memory address register (i. e. stages U1A through T4A) to a first count (i. e. count of 1) for addressing the first memory location whose contents are to be read. A Load Memory Read (RXLMR) flip-flop 1064 forces function RXLMR10 to a ONE when switched to a one by function RXINC10. The function R XLMR10 in turn switches a Read Command flip-flop 1062 to its ONE state when function RXMRS10 is a ONE. The function RXMRSD10 comes high in accordance with the equation: RXMRS10=RXBCA10 · RXDAAOO. The function RXDAAOO comes high one clock pulse (PDA) after the End of Data Character function RXDAR10 is generated. Function RXDAR10 is generated in accordance with the equation RXDAR10=RXFSWOM · RXB0810 · RXLMROO + RXFSWIM · MMMLR10 · RXLMROO · RXB1010. The functions RXFWOM and RXFSWIM are generated in accordance with the setting of the DCA's FIELD/NORMAL mode switch as described herein.

When the bit read out is sensed by a sense amplifier 1022, it is stored in a flip-flop memory local register 1024 when function MMRDC10 is forced high by flip-flop 1062 being set to a ONE. At the next PDA pulse, flip-flop 1062 then resets. Assuming that the information bit is to be restored, then the output MMRDC10 of the flip-flop 1024 switches a write command MMWTC flip-flop 1034 which forces function MMWTC10 to a ONE if the bit read from memory 1020 is a binary ONE. If the bit is a binary ZERO, the MLR output of flip-flop 1024 will not switch flip-flop 1034 to a ONE. Accordingly, a binary ONE or ZERO will be written into the addressed bit location in accordance with the state of flip-flop 1034. As the bits of a character are read out of memory, parity is computed in a conventional manner.

Where the bit to be written into the addressed bit location constitutes new information, such as that previously stored in the buffer register 1030, then MMWTC flip-flop 1034 will be set and reset by function RXMWS10 generated in accordance with the state of the "ONE" output of the first stage DB1 of register 1030. Upon the termination of the memory cycle, the bit counter 1042 is incremented by one and the above operation is repeated for the next bit of a character. When the bit counter 1042 reaches a count of 8 and 10, the decoder 1036 generates outputs BO810 and B1010 respectively. Depending upon the position of the Field/Normal mode switch, one of these outputs will reset flip-flop 1064 to a ZERO which forces function RXLMROO to a ONE. The memory address register 1040 is now ready to accept the next RXINC 10 signal for read out of the bit contents of the next memory location. Also function RXLMROO will in turn reset the bit counter 1042 stages to ZEROS by forcing RXBCR10 high and inhibit advance gate 1041 by forcing function RXBCA10 low.

Further memory cycles may be initiated until the last character (here the eightieth character) is written into the memory 1020. At that time an end of data (RXEOD10) function comes high as described herein which causes function RXLOD10 to be forced high which in turn resets the stages of MAR 1040 to ZEROS.

As mentioned, parity is generated in a conventional manner for each character. Specifically, the parity generation and checking logic block of FIG. 7 includes a single flip-flop which is initially set to its ONE state at the beginning of a character interval by functions RXBCO10 (bit count ZERO) and RXLMR10. The state of this flip-flop is switched whenever a binary ONE is read out of an addressed bit location. At the end of the character interval when function RXLMROO is a ONE, the state of the flip-flop is checked. In the case of odd parity, if the parity is correct then the flip-flop will be in its ZERO state. And, if the parity is incorrect, the flip-flop will be in its ONE state which will force the parity error function to a ONE. This in turn will generate a check condition by switching the check flip-flop, not shown, to its ONE state forcing function IGCHF10 to a ONE.

I/O DCA TRANSFER CONTROL LOGIC

As shown in FIGS. *7f* and *7g*, the memory and control section 570 transmits and receives respectively data characters to and from its associated device, as well as from lines OSBO10Z through OSBO80Z of the bus 150 via LTR and LRE bus interface circuits 512 and 510 respectively. Referring to FIG. 7g, it will be noted generally that the I/O DCA is divided into two sections. One section (IDCA) labeled as block 590 handles transfers from its associated peripheral device to the memory 1020 and from memory 1020 to the bus 150 when the device is operated as an input device (here as a card reader). The other section (ODCA) labeled as block 600 handles transfers from the bus to memory 1020 and from memory 1020 to its peripheral device when it is operated as an output device (here as a card punch). It will be appreciated that in the case of either an input or an output device only one section will be required. The logic circuits referenced above will be only described relative to the operation of the present invention. For further details reference may be made to the copending application of Robert E. Huettner and Edward B. Tymann titled "Remote Terminal System".

DESCRIPTION OF OPERATION

The operation of the subject invention relative to FIGS. 1 through *7g* will now be described. It is assumed that the system is operating in the block mode and that the scanner 100 is going to activate a first input device assigned address code 0001 for a data transfer operation. The scanner 100 applies address code 0001 to the bus during a first ON-LINE cycle and forces function DACOO to a ONE as to define the cycle as an Address Cycle.

It is assumed that the input device is the card reader/-punch 140 of FIG. 1, and that prior to the scanner 100 placing its address code onto the bus 150, its device controller (DCA) is in the ready state. That is, the Ready state flip-flop 601 of FIG. *7a* has been switched to its ONE state. Accordingly, when its address code is applied to the bus 150, its Address Response logic circuits of FIG. *7d*, will be operative to activate its address gate 990 which in turn forces function 1FADR10 to a ONE and switches Address Response flip-flop 982 to its ONE state.

The function 1FADR10 causes the IDCA to switch its on-line state flip-flop 620 to its ONE state and at the same time reset its Ready flip-flop 601 to its ZERO state via hold gate 616. Simultaneously therewith, the Address Response flip-flop 982 conditions the bus Interface logic of FIG. *7b*, to generate a ready response via line OSB170Z to its address code.

Once the DCA is in the on-line state, it will transfer data characters as soon as its input device has completed the loading of its memory with data characters. The device speed will determine the number of ON-LINE cycles before the input device places a data character onto the bus 150. Since the transfer operation relative to loading the IDCA's memory forms no part of the present invention, it will not be described herein. However, for further details, reference may be made to the aforementioned copending application of Robert Huettner and Edward Tymann titled "Remote Terminal System" filed on even date herewith.

When the input device reads a data character out of its memory into its buffer 1030 and places it on the bus 150, it forces the input data line to a binary ZERO (i. e. function IFIDAOO is forced to a ZERO and function IFIDA10 to a ONE). The function IFIDA10 conditions the Bus Interface Logic of FIG. *7b* to generate transfer function IHSTL10 which enables the DCA data buffer register 1030 of FIG. *7f*, to store the data character code applied to bus lines OSBO10Z through OSBO80Z. Under normal operation, the ODCA Of each output device will initiate a read-write memory cycle and write the character into its memory. And, upon completing the writing operation, the DCA will condition its Interface Logic of FIG. 7*b* to force the ready line to a binary ZERO signaling that it is now ready for a next character. The scanner 100 will generate a control pulse in response to a change of state in the ready line (i. e. when all devices have accepted the data character). This will then reset the Device Ready flip-flop 920 of FIG. 7*c* of each of the output devices and the input device to the ZERO state via function IGNEC10. When each of the output devices flip-flop 920 switches to a ZERO, it forces function IFDRF10 to a ZERO which causes the ready line to be forced to a ONE when the function IFDRL10 is forced to a ZERO. An input device function IFDRL10 being forced to a ZERO in turn conditions the logic of FIG. 7*c* to force input data line to a ZERO. The input data line remains in this state until the input device reads out a next character from its memory and applies it to the bus 150 at which time it will again force function IFIDAOO to a ONE. Similarly, each output device until having accepted the next data character and written it into its memory will not change the state of its Ready flip-flop 920 and the ready line.

INPUT DEVICE FAILURE

The above operations are repeated for each data character until a failure occurs in the input device controller or in the input device which prevents the bus interface logic circuits of FIG. 7*b* from transferring a data character from the memory to the bus 150. This will inhibit the logic circuits from forcing the data function IFIDAOO to a ZERO signaling that the IDCA has placed a data character on the bus 150. For example, if a parity error was detected by the parity generator and checking circuits of FIG. 7 after a data character has been assembled in the data buffer 1040, this would activate the gate 856 of block 840 of FIG. 7*b* forcing function IGCHH10 to a ONE and function IFCHHOO to a ZERO. This in turn inhibits Ready flip-flop 920 of FIG. 7*c* from being switched to a ONE and function IFDRL1A from being forced to a ONE. Therefore, the data character in the buffer 1040 is not applied to the bus and the data input function is not forced to a ZERO.

It will be appreciated that when any one of the remaining above-mentioned error conditions are detected (i. e. a bus strobe when no state is active and device checks) during a character transfer that the input data function IFIDAOO will remain at a ONE. Additionally, it will be appreciated that certain disparities in timing may also cause the function IFIDAOO to remain at a "ONE" for an undetermined period of time.

When the above occurs, the deactivation logic section 400 of FIG. 3d. is enabled. In particular, when the input device does not force the input data function low after the scanner control pulse RMCOLIA and the function IFIDAOO remains high for a time interval greater than that of timer 410 as measured from the time that the scanner generated a control pulse RMCOLIA, the timer 410 is operative to generate an output pulse. This pulse causes flip-flop 414 to be switched to its ONE state. Since function RMIDAOO is high or a ONE, flip-flop 422 will be switched to its ONE state indicative of the fact that the input device transferring data has failed.

When flip-flop 422 switches to a ONE, it forces function RMIDR10 to a ONE which causes Idle flip-flop 426 and Release flip-flop 392 to be switched to their ONE states. This in turn forces function IFRELOO and IFIDLOO to binary ZEROS, via lines OSB140Z and OSB150Z respectively.

Referring to FIG. 7b, it will be noted that the logic 800 will be conditioned when both functions IFRELOO and IFIDLOO are ZEROS to switch the check memory flip-flop 820 to its binary ONE state via gates 824 and 822. This in turn forces function IFCRM10 to a ONE which also forces functions IFNCM10 and IFNCR10 to ONES. The function IFCRM10 will cause the Idle state flip-flop 680 to be switched to its ONE state via gate 689 and the on-line state flip-flop 629 to be switched to its ZERO state via hold gate 636. This logically disconnects the input device from the bus.

The function IFNCR10 will condition the active logic gate 731 to force function IGACT10 to a ZERO. This function resets pertinent Read Command flip-flops to their ZERO states and inhibits the input device from transferring data characters from its memory to the data buffer register 1030. Specifically, function IGACT10 switches the Read Order Stored RXROS flip-flop to its ZERO state which inhibits the Read Data from Bus RXDRD flip-flop from being switched to a ONE which maintains function RXDRD10 at a ZERO. It will be noted from FIG. 7*f* that function RXDB11T will also be a ZERO which inhibits a data character from being read from memory into the data buffer register 1030.

OUTPUT DEVICE FAILURE

It is assumed that the input data transfer is proceeding normally and that one of the output device DCA's or its device fails. The output device logic section will not be operative to force a change in state in the ready line since the failure should prevent the DCA of the failed output device from writing the character into its memory and switching Ready flip-flop to its ZERO state signaling that it accepts the bus character. That is, only after the ODCA writes the complete character into its memory does it generate function IHCTV10. If the failure interrupts this operation, function IHCTN10 remains a ZERO which maintains function IFDRFOC a ZERO.

It will also be noted that each time the ODCA transfers a character into its buffer register it checks its parity and in case of an error forces function IHPER10 to a ONE. This function also inhibits the ODCA from writing the character into its memory and forcing character taken function IHCTN10 to a ONE. This maintains function IFDRFOC at a ZERO which maintains the ready line in its original state.

Because the ready line remains in a ONE state (i. e. −2 volts), the scanner 100 will not generate a control pulse RMCOLOA and this in turn prevents the IDCA from generating function IGNEC10 so as to reset its Ready flip-flop 910 to a ZERO to force the input data line high. Therefore, the IDCA will apply the same character to the bus 150 until the deactivation logic timer 410 of FIG. 3d produces an output pulse. As mentioned above, this pulse switches flip-flop 414 to a ONE activating AND gate 416. Since the function RMIDAOO is a ZERO, flip-flop 420 will be switched to its ONE state. This forces function RMODR10 to a ONE which causes Idle flip-flop 426 to be switched to its ONE state and forces line OSB150Z to a ZERO.

The Interface Logic Section 800 of FIG. 7b in response to function IFIDLOO being forced to a ZERO and function IFRELOO being a ONE will cause Check Release Memory flip-flop 820 to be switched to its ONE state via gate 824. This in turn forces function IFCRM10, IFNCM10 and IFNCR10 to ONES. Referring to FIG. 7*a*, it will be noted that when functions IFDRF10, IGOUT10, IFNSF10 and IFCRM10 are all ONES, they will switch Idle State flip-flop 680 to its ONE state.

It will be noted that only the failed output device will have its Ready flip-flop 910 in its ONE state which causes function IFDRF10 to be a ONE. Therefore, only its DCA will have its Idle State flip-flop switched to a ONE which places the device controller in the idle state. This will in turn cause the check flip-flop, not shown, to be switched to a ONE which in turn generates a check condition.

The ODCA's which have switched their Ready flip-flop 910 to its ZERO state will be switched from the on-line to the ready state. That is, function IFISF2A will be a ONE when the ODCA is not being switched to its idle state and this in turn forces function RXRDB10 to a ONE which switches the Ready state flip-flop 601 to a ONE. Additionally, the function IFIDL10 and IGINP10 switch Memory Release flip-flop to a ONE which forces function INFRM10 to a ONE. This in turn causes the Ready State (IGRSF) flip-flop to be switched to a ONE via functions IFNSF10, IFFSF10 and RXRDB10.

When an ODCA is monitoring on-line transfers while in the audit trail state and fails, it will cause the scanner 100 to deactivate the device by switching its Idle state flip-flop 680 to a ONE via functions IGASF10, IFDRDOO AND IFCRM10. The function IFDRDOO is a ZERO when the device is not ready, caused by a device failure or by a parity error or other error condition which forced function IGCHHOO to a ZERO.

It will be noted that switching the idle state (IGISF) flip-flop of the ODCA to a ONE prevents the memory data characters with errors from being printed by the output of a failed device controller. Also, when the ODCA is switched to the idle state, the function IGISF10 together with check release function IFCRM10 will generate a check condition via forcing function IGCHF10 to a ONE.

In greater detail, the function IFNCR10 will force function IGACT10 to a Zero and function IGACTOO to a one. This in turn resets certain pertinent Write Command flip-flops of FIG. 7*g* to their ZERO states. Specifically, it resets Punch Order Stored RXPOS flip-flop to its ZERO state. This inhibits the Punch Set Order RXPSO flip-flop from being switched to its ONE state. This maintains function RXPSO10 at a ZERO which maintains function RXDB11T at a ZERO and inhibits the bits of a data character from subsequently being read from memory into the data buffer register 1030. It will be appreciated that with the addition of relatively few logic circuits that a predetermined character code may be substituted for each character detected as having bad parity when these such logic circuits are conditioned by an operator to operate in a so called substitute mode. In such event, the substituted character will be written into memory and its acceptance acknowledge thereby preventing the aforementioned deactivation. Accordingly, the output device will thereafter print the substituted character in place of the character with bad parity. It will be noted that this same kind of operation is readily performed with respect to characters which the output device logic circuits detect as representing illegal or invalid character codes.

It will be appreciated that the invention through the introduction of very few logic circuits in the device scanner and the device controllers are able to detect both input device failures and output device failures which prevent the particular device controller from responding normally during data transfer operations.

By monitoring the states of only a few control lines, the device scanner is able to distinguish between a failed input device and a failed output device. Accordingly, it is able through other control lines to logically disconnect the failed device through its controller from the system thereby enabling the system to continue on-line processing.

Additionally, when the device scanner deactivates an input device, the COMM DCA is operative upon detecting such deactivation via the same control lines to send a cancel message to the remote data processing system indicating such failure. And, when the device scanner deactivates an output device, the COMM DCA sends an abort message to the remote data processing system indicating that the terminal is unable to process the message. For details relative to the foregoing, reference may be made to the copending application titled A Communication Control Device utilized as an Input-/Output Module for a Terminal System referenced above.

It will be also noted that in the case of an ODCA, the data characters with bad parity are not accepted and cause the device scanner to deactivate the device. This prevents erroneous data characters from being printed out by the output device. More importantly, this arrangement permits the input device to continue to apply the same data character on the bus and transient noise conditions will not affect the transfer operation unless they persist for a length of time established by the device scanner timer. That is, the ODCA will accept the data character when it determines that it has correct parity during a subsequent ON-LINE cycle after the noise has subsided. As mentioned, this mode of operation may be extended to include character codes detected as invalid or illegal and may be supplemented by substitution logic circuits.

It will also be appreciated that the time out period of the timer is adjustable allowing for changes in environment as well as changes in the duration of the bus cycles themselves. Further, it will be noted that notwithstanding that a plurality of ODCA's share the common bus lines, only the failed ODCA will be logically disconnected from the system and switched from an active state (e. g. on-line or audit trail state) to an inactive state. The remaining ODCA's will be switched to an intermediate state (e. g. ready state) whereafter they can be agin switched to the on-line state when they are subsequently selected or polled for data.

To prevent undue burdening the description with matter within the kon of those skilled in the art, a block diagram approach has been followed, with a detailed functional description of each block and specific identification of the circuitry it represents. The individual engineer is free to select elements and components such as flip-flop circuits, shift register, etc. from his own background or from available standard references such as Arithmetic Operations in Digital Computers by R. K. Richards (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A data processing system comprising:

a bus;

a plurality of peripheral devices;

a plurality of addressable device control means, each of said addressable control means being coupled to said bus and to at least a different one of said plurality of said devices for enabling the transfer of data characters between said different one device and said bus; and, a control means for generating a plurality of address codes for conditioning said addressable device control means for activating said devices, said control means being coupled to said bus and further including means for monitoring the periods of inactivity on said bus between character transfers, said means being operative when said period of inactivity exceeds a predetermined amount to generate signals on said bus coded to condition said plurality of addressable device control means to release only the devices producing said period of inactivity.

2. A data processing system comprising:

a bus;

a control means;

a plurality of different classes of peripheral devices; and, a corresponding number of addressable device controllers, each of said controllers arranged to interconnect at least a different one of said plurality of said devices to said bus and activate said device for a data transfer operation wherein data characters are transferred between said different one device and said bus, said control means further including monitoring means coupled to said bus for detecting a period of inactivity on said bus between character transfers occuring during said data transfer operation, said monitoring means including means operative when said period of inactivity exceeds a predetermined amount to selectively apply predetermined signal levels to said bus to condition said addressable device controllers to release only the devices causing said period of inactivity.

3. The system of claim 2 wherein said monitoring means includes variable timing means for establishing said of activity period.

4. The system of claim 2 wherein said different classes of peripheral devices includes input devices and output devices, each of said device controllers further includes: logic means coupled to said bus; and state selection means for defining a plurality of operational states for said device, said state selection means being coupled to said logic means bus and said logic means being operative in response to said predetermined signal levels to switch from its operating state to a predetermined state said state selection means of only said device causing said period of inactivity.

5. The system of claim 4 wherein said predetermined state is an inactive state defined as an idle state.

6. The system of claim 2 wherein said different classes of peripheral devices includes input devices and output devices, and said bus includes a plurality of data and control lines; and, said means of said monitoring means further including first means coupled to receive from a first control line, a signal whose state defines when a device controller coupled to an input device applies a data character to said bus, timing means coupled to said first means and check release control means coupled to said timing means and to second and third control lines, said timing means being operative to generate an output signal when said signal applied to first control line by said input device remains in an initial state after a predetermined period of time indicative of said period of inactivity and said release control means being operative to switch said second and third control lines to predetermined states in response to said output signal, releasing said input device from said bus.

7. The system of claim 6 wherein said means of said monitoring means further includes second means for receiving from a further control line a signal whose predetermined change in state defines when all of said output device controllers of said activated output devices have accepted said data character applied to said bus, said second means being coupled to condition said timing means to produce said output signal when said signal from said further control line remains in an initial state for a predetermined period of time and said check release control means being conditioned by said output signal and the state of said signal from said first control line to switch a predetermined one of said second and third control lines to a predetermined state, releasing only the output device from said bus causing said signal from said further control line to remain in an initial state for said predetermined period of time.

8. The system of claim 6 wherein each of said device controllers of each of said input devices includes:

state selection means including a plurality of bistable storage devices, each of which define a different one of a plurality of operational states for said device controller;

memory storage means coupled to said bus, said memory storage means including a plurality of memory character storage locations for storing at least a block of data characters; and, input data control means coupled to said first control line and to said memory means, said input data control means including gating means for receiving a check condition input signal level, and being operative to inhibit said first control line signal from being switched from said initial state to said predetermined state when said data character is to be applied to said bus in the presence of said check signal level whereby said release control means is operative to switch said second and third control lines to said predetermined states when said first control line remains in said initial state after said predetermined period of time.

9. The system of claim 8 wherein the device controllers of said input devices, each includes memory release means coupled to said bus and to predetermined ones of said bistable storage devices of said state selection means, said memory release means being conditioned by the signal levels applied to said second and third control lines to switch said state selection means from an active state to an inactive state whereby upon the subsequent addressing of said device, said device controller is conditioned by said state selection means to signal that said device is unavailable for performing further processing.

10. The system of claim 9 wherein said bistable storage devices of said state selection means are interconnected so that only one of said devices is able to be switched to its binary ONE state during any period of time which after said switching all of the remaining devices are in their bwnary ZERO states whereby the bistable device in a binary ONE state defines the operational state of said device controller of an input device.

11. The system of claim 10 wherein said state selection means includes at least three bistable storage devices for defining an idle state, a ready state, and an online state respectively wherein said on-line state device defines an active state and is switched to a binary ONE by said state selection means upon selection thereof after said selection means switches said idle and ready state bistable devices to their ONE states in sequence, said idle state bistable device defining an inactive state and being conditioned to be switched to a binary ONE when said on-line state device is a binary ONE and a signal representative of a device failure is present.

12. The system of claim 7 wherein each of said device controllers of each of said output devices includes:

state selection means including a plurality of bistable storage devices, each of which define a different one of a plurality of operational states for said device controller;

memory storage means coupled to said bus, said memory storage means including a plurality of memory character storage locations for storing at least a record of data characters; and, device response means coupled to said further control line and to said memory storage means, said device response means being operative to switch said line from an initial state to a predetermined state only when said device controller has accepted said data character and has written it into said memory storage means and said data response means being operative in response to a signal indicative of a failure in said device controller to maintain said further control line in said initial state for said predetermined period of time thereby causing said predetermined one of said second and third control lines to be switched to a predetermined state.

13. The system of claim 12 wherein each of said device controllers of each of said output devices further includes memory release means coupled to said bus and to predetermined ones of said bistable storage devices of said state selection means, said memory release means being conditioned by said signal level applied to said predetermined one of said second and third control lines to switch said state selection means from an active state to an inactive state whereby during subsequent addressing of said device, said device controller is conditioned by said state selection means to signal that said device is unavailable for performing further processing.

14. The system of claim 13 wherein said bistable storage devices of said state selection means are interconnected so that only one of said devices is enabled to be switched to its binary ONE state during any period of time while all of the remaining devices after said switching are in their binary ZERO states whereby the bistable device in a binary ONE state defines the operational state of said device controller of an output device.

15. The system of claim 14 wherein said device controller state selection means includes at least three bistable storage devices for defining an idle state, a ready state and an on-line state respectively wherein said online state device defines an active state and is switched to a binary ONE by said state selection upon the selection thereof after said selection means switches said idle and ready state devices to their ONE states in sequence, said idle state device defining an inactive state and being conditioned to be switched to a binary ONE when said on-line state device is in a binary ONE state and when said device response means maintains said further control line in said initial state, indicative of a device failure.

16. The system of claim 15 wherein said device state selection means includes a further bistable device for defining an additional active operational state for said device controller, said further bistable device being arranged to be switched to a binary ONE by said selection means upon the selection thereof after said selection means switches said idle and ready state bistable devices to their ONE states in sequence and said further bistable device being arranged to be switched to a ZERO and said idle state device being switched to a binary ONE in response to a signal level from said second and third control lines of said bus indicative of a device failure and a signal from said device controller indicating that the output device associated therewith is not ready to transfer data characters.

17. In a remote terminal system for processing online transfers of data characters between a data processing system and a plurality of peripheral devices comprising:

a bus including a plurality of data and control lines;

a plurality of input and output peripheral devices;

a corresponding number of addressable device controllers, each of said controllers arranged for interconnecting at least a different one of said devices for enabling the transfer of data characters between said different one device and said bus;

a device scanning means, said device scanning means being operative to establish the timing for said transfer of data characters and including:

first input means for receiving from a first control line of said bus, a first control input signal level whose state defines when an input device applies a data character to said bus;

second input means for receiving from a second control line of said bus, a second control input signal level whose change in state defines when all of output devices conditioned by said device controllers associated therewith to receive said data characters, have sampled said data character applied to said bus; and, deactivation means coupled to said first and second input means and to other control lines of said bus, said deactivation means including means for monitoring the state of first and second input signal levels, said monitoring means being operative in the absence of a change of state in said levels for a predetermined period of time, indicative of a device failure to selectively apply to said other control lines, predetermined signal levels coded in accordance with the state of said first control signal level for disconnecting selectively from said bus only those input and output devices which have failed thereby enabling said system to continue said on-line transfer with the remaining input and output devices.

18. The system of claim 17 further including communications control means coupled to said bus for transferring data characters between said data processing system and said bus, said communications control means being operative in response to said predetermined signal levels applied to said other control lines to transmit a predetermined message signaling said data processing system of said device failure.

* * * * *

UNITED STATES PATENT OFFICE
CERTIFICATE OF CORRECTION

Patent No. 3,810,120 Dated May 7, 1974

Inventor(s) Robert E. Huettner et al

It is certified that error appears in the above-identified patent and that said Letters Patent are hereby corrected as shown below:

Column 31, line 54, delete "occuring" and insert --occurring--.

Column 31, line 63, delete "of activity period" and insert --period of activity--.

Column 33, line 20, delete "bwnary" and insert --binary--.

Signed and sealed this 1st day of October 1974.

(SEAL)
Attest:

McCOY M. GIBSON JR.
Attesting Officer

C. MARSHALL DANN
Commissioner of Patents

FORM PO-1050 (10-69)
USCOMM-DC 60376-P69
* U.S. GOVERNMENT PRINTING OFFICE : 1969 O—366-334.